(12) United States Patent
Yamashita

(10) Patent No.: US 8,747,222 B2
(45) Date of Patent: Jun. 10, 2014

(54) GAME SYSTEM, GAME DEVICE, STORAGE MEDIUM STORING GAME PROGRAM, AND IMAGE GENERATION METHOD

(75) Inventor: Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 46 days.

(21) Appl. No.: 13/368,826

(22) Filed: Feb. 8, 2012

(65) Prior Publication Data

US 2012/0309523 A1 Dec. 6, 2012

(30) Foreign Application Priority Data

Jun. 2, 2011 (JP) .................................. 2011-124579

(51) Int. Cl.
A63F 9/24 (2006.01)
A63F 13/00 (2014.01)

(52) U.S. Cl.
USPC .................... 463/31; 463/30; 463/36; 463/37

(58) Field of Classification Search
USPC .............................. 463/30–32, 36–43, 46, 47
See application file for complete search history.

(56) References Cited

U.S. PATENT DOCUMENTS

| | | | | |
|---|---|---|---|---|
| 4,710,873 A * | 12/1987 | Breslow et al. | ................. | 463/31 |
| 6,435,969 B1 * | 8/2002 | Tanaka et al. | .................... | 463/44 |
| 6,821,204 B2 * | 11/2004 | Aonuma et al. | ................. | 463/32 |
| 6,894,686 B2 * | 5/2005 | Stamper et al. | ................ | 345/419 |
| 6,921,336 B1 * | 7/2005 | Best | ................ | 463/32 |
| 6,966,837 B1 * | 11/2005 | Best | ................ | 463/33 |
| 6,994,626 B1 * | 2/2006 | D'Achard Van Enschut | .. | 463/31 |
| 7,115,031 B2 * | 10/2006 | Miyamoto et al. | ................. | 463/1 |
| 8,419,537 B2 * | 4/2013 | Miyamoto et al. | .............. | 463/31 |
| 2002/0165028 A1 * | 11/2002 | Miyamoto et al. | .............. | 463/46 |
| 2003/0100363 A1 * | 5/2003 | Ali | ................. | 463/30 |
| 2003/0216177 A1 * | 11/2003 | Aonuma et al. | ................. | 463/32 |
| 2003/0220145 A1 * | 11/2003 | Erickson et al. | ................ | 463/47 |
| 2004/0023719 A1 * | 2/2004 | Hussaini et al. | ................ | 463/37 |
| 2004/0266529 A1 * | 12/2004 | Chatani | .......................... | 463/40 |
| 2005/0007384 A1 * | 1/2005 | Yamada et al. | ................ | 345/619 |
| 2005/0078125 A1 * | 4/2005 | Yamada et al. | ................ | 345/646 |
| 2006/0223635 A1 * | 10/2006 | Rosenberg | ...................... | 463/37 |
| 2006/0267928 A1 * | 11/2006 | Kawanobe et al. | ........... | 345/156 |
| 2008/0200247 A1 * | 8/2008 | Yoshizawa | ...................... | 463/31 |
| 2010/0160050 A1 | 6/2010 | Oku | | |
| 2010/0255910 A1 * | 10/2010 | Miyamoto et al. | .............. | 463/31 |
| 2011/0159957 A1 * | 6/2011 | Kawaguchi et al. | ............ | 463/31 |

(Continued)

FOREIGN PATENT DOCUMENTS

JP 2010-142592 7/2010
WO WO 2007128949 A1 * 11/2007 .............. A63F 13/10

Primary Examiner — Milap Shah
(74) Attorney, Agent, or Firm — Nixon & Vanderhye P.C.

(57) ABSTRACT

An example game system includes a portable display that includes an image-capturing unit, and a display unit. The game device obtains first operation data representing an operation performed on a controller device, second operation data representing an operation performed on the portable display, and data of a image captured by the image-capturing unit. In a virtual space, an action of a first control object is controlled based on first operation data and an action of a second control object is controlled based on second operation data. The game device generates a first game image including a game image that represents the virtual space and corresponds to the first control object, and at least a portion of the captured image. The first game image is displayed on a predetermined display. The game device generates a second game image corresponding to the second control object, and displays the second game image.

31 Claims, 16 Drawing Sheets

(56) References Cited

U.S. PATENT DOCUMENTS

| | | | |
|---|---|---|---|
| 2011/0190061 A1* | 8/2011 | Takeda et al. | 463/39 |
| 2012/0309512 A1* | 12/2012 | Abe | 463/30 |
| 2012/0309513 A1* | 12/2012 | Abe | 463/30 |
| 2012/0309542 A1* | 12/2012 | Nogami et al. | 463/42 |
| 2013/0090165 A1* | 4/2013 | Shikata et al. | 463/31 |

* cited by examiner

GAME SYSTEM, GAME DEVICE, STORAGE MEDIUM STORING GAME PROGRAM, AND IMAGE GENERATION METHOD

CROSS REFERENCE TO RELATED APPLICATION

The disclosure of Japanese Patent Application No. 2011-124579 filed on Jun. 2, 2011, is incorporated herein by reference.

FIELD

The present specification discloses a game system, a game device, a storage medium storing a game program, and an image generation method, in which captured images that are captured by a camera, or the like, are used in a game, or the like.

BACKGROUND AND SUMMARY

There are conventional techniques allowing captured images that are captured by a camera, or the like, to be used in a game. For example, there is a conventional portable game device provided with a camera. This game device allows a captured image that is captured by the camera to be used as a part of the game image. For example, the game device may use the camera to capture images of the face of the player while playing the game, and may use the captured images in game processes as game inputs or display the captured images after the game is ended. Thus, the player can use captured images in game operations, and enjoy watching the facial expression of the player herself/himself after the game is ended.

The game device described above is a portable game device, and captured images including the player are displayed on the screen of the game device. Therefore, only the player who is using the portable game device can watch the captured images, and people other than the player cannot watch the captured images. With the conventional technique, it is not possible, for example, for people other than the player to enjoy watching the facial expression of the player during gameplay.

Therefore, the present specification discloses a game system, a game device, a storage medium storing a game program, and an image generation method, with which it is possible to present, to people other than the player, images of the player during gameplay.

(1)

An example game system described in the present specification includes a controller device, a portable display device, and a game device. The portable display device includes an image-capturing unit, and a display unit. The game device includes a data obtaining unit, an action control unit, a first image generation unit, a second image generation unit, a first image output unit, and a second image output unit.

The data obtaining unit obtains first operation data representing an operation performed on the controller device, second operation data representing an operation performed on the portable display device, and data of a captured image captured by the image-capturing unit. The action control unit controls an action of a first control object based on the first operation data and an action of a second control object based on the second operation data in a virtual space. The first image generation unit generates a first game image which includes a game image that represents the virtual space and corresponds to the first control object, and at least a portion of the captured image. The second image generation unit generates a second game image that represents the virtual space and corresponds to the second control object. The first image output unit outputs the first game image to a predetermined display device separate from the portable display device. The second image output unit outputs the second game image to the portable display device.

The "controller device" may be any device that can be controlled by the player, and is capable of outputting operation data. The "controller device" may include operation units such as operation buttons, and various sensors such as an acceleration sensor and a gyrosensor, as does a controller 5 to be described later, or may include only one of them, or may include a different input unit such as a touch panel, for example.

The "portable display device" may be any device that includes an image-capturing unit and a display unit and can be controlled, as is a terminal device 7 in the embodiment to be described below. The term "portable" means that the device is so sized that the player can hold and move the device or can place the device in any desired position.

The "game device" may be any information processing device that can perform game processes and generate game images based on the game processes. The game device may be a single-purpose information processing device for games, or a general-purpose information processing device such as an ordinary personal computer.

As long as the "game system" includes a game device, a controller device, and a portable display device, it may or may not include a predetermined display device for displaying the first game image. That is, the game system may be provided with or without the predetermined display device included therein.

While the "virtual space" is a three-dimensional virtual space (game space) in the embodiment to be described below, it may be a two-dimensional plane.

The "first control object" and the "second control object" may be any objects whose action can be controlled by operations by the player, including objects arranged in the game space, puzzle elements (blocks, etc.) in the puzzle game, cursors displayed on the screen, etc.

The "game image corresponding to a control object" is the game image used for controlling the control object, and is a concept including, for example, a game image representing the game space including the control object, a game image representing the game space as viewed from the position of the control object, etc.

With the configuration (1) above, the game device generates the first game image which includes a game image that corresponds to the first control object controlled by the controller device, and at least a portion of the captured image captured by the portable display device. Then, the first game image is displayed on the predetermined display device different from the portable display device. Therefore, with the configuration (1) above, images of the player during gameplay can be presented also to people other than the player who is using the portable display device, by means of the predetermined display device. For example, where the portable display device captures an image of the face of the player, people other than the player can also enjoy watching the facial expression of the player during gameplay.

(2)

The game device may further include a face recognition unit for performing a recognition process for recognizing a face in the captured image. Then, the first image generation unit generates the first game image so that the first game image includes a portion of the captured image that includes an image of the face recognized by the face recognition unit.

With the configuration (2) above, it is possible to more accurately display the face of the player on the predetermined display device. Thus, players can enjoy watching the facial expression of the player during gameplay. If the first image generation unit performs a predetermined process (e.g., the process of steps S13 to S15) on the captured image (camera image) as in the embodiment to be described below, it is possible to display the face of the player in a more easy-to-view manner.

(3)

The first image generation unit may perform a predetermined image process on the image of the captured image that includes the face recognized by the face recognition unit, thereby generating the first game image including the processed image.

With the configuration (3) above, an image in accordance with the contents of the game, or a special game-related effect, may be added to the image of the face of the player displayed on the predetermined display device. It is also possible to display the face of the player in such a manner the face looks better.

(4)

The face recognition unit may perform the recognition process in response to the obtainment of the captured image by the data obtaining unit. Then, the first image generation unit generates a first game image including the image of the recognized face in response to the recognition of the face by the recognition process. The first image output unit outputs the first game image to the predetermined display device in response to the generation of the first game image.

With the configuration (4) above, the first game image is generated and displayed on the predetermined display device in response to the obtainment of the captured image. Then, the game system can display, in real time, the face of the player during gameplay on the predetermined display device. The term "real time" as used herein is not limited to cases where the process of obtaining the captured image and the process of displaying the first game image based on the obtained captured image are performed within one frame, but may include cases where there is a time lag between the obtaining process and the display process. That is, there may be a time lag between the obtaining process and the display process if some time is required for the recognition process or the image generation process, for example.

(5)

The data obtaining unit may successively obtain data of the captured image. Then, the first image generation unit updates the image of the recognized face with a frequency that is less than that with which the data obtaining unit obtains data of the captured image.

With the configuration (5) above, the game device does not have to perform the recognition process for all of the captured images which are obtained successively, and it is therefore possible to reduce the process load on the game device from the recognition process.

(6)

The game device may further include a first camera setting unit, and a second camera setting unit. The first camera setting unit sets a first virtual camera corresponding to the first control object in the virtual space. The second camera setting unit sets a second virtual camera corresponding to the second control object in the virtual space. Then, the first image generation unit generates, as a game image corresponding to the first control object, a game image representing the virtual space as viewed from the first virtual camera. The second image generation unit generates, as a game image corresponding to the second control object, a game image representing the virtual space as viewed from the second virtual camera.

With the configuration (6) above, game images representing the virtual space are generated using virtual cameras corresponding to different control objects, and it is therefore possible to easily generate the game image even when the viewing point and the viewing direction vary.

(7)

The action control unit may perform a control of moving a first object arranged in the virtual space, as the first control object, based on the first operation data. Then, the first camera setting unit sets the first virtual camera so that the first object is included in a viewing field range of the first virtual camera.

With the configuration (7) above, a first game image including the first object controlled by the player who is using the controller device is displayed on the predetermined display device. Therefore, the player can easily perform game operations by looking at the game image including the player's control object therein.

(8)

The action control unit may perform a control of moving a second object arranged in the virtual space, as the second control object, based on the second operation data. Then, the second camera setting unit sets the second virtual camera so that the second object is included in a viewing field range of the second virtual camera.

With the configuration (8) above, a second game image including the second object controlled by the player who is using a portable display device is displayed on the portable device. Therefore, the player can easily perform game operations by looking at the game image including the player's control object therein.

(9)

The game device may further include an image storage unit for storing a captured image obtained at a predetermined point in time in a predetermined storage unit. Then, the first image generation unit generates a first game image including at least a portion of the captured image stored in the storage unit.

The "predetermined point in time" is a concept including any point in time during the game. The "predetermined point in time" is, for example, a point in time when the control object obtains a particular item, a point in time when a level is passed, a point in time when a new high score is set, a point in time when the game is over, a point in time when one of the players performs a predetermined operation, etc.

With the configuration (9) above, the game system can store, and display on the predetermined display device, the facial expression of the player at the point in time when an event occurs in the game. Then, for example, it is possible to display, on a television 2, the facial expression of the player when the player sets a new high score, the facial expression of the player when the game is over, etc.

(10)

The game device may include a plurality of controller devices. Then, the action control unit controls an action of each of the plurality of first control objects based on corresponding first operation data. The first image generation unit generates a first game image including a plurality of game images corresponding respectively to the plurality of first control objects and at least a portion of the captured image.

With the configuration (10) above, even if a plurality of players are using controller devices, it is possible to display, on the predetermined display device, game images corresponding to the control objects of the players in an easy-to-view manner.

(11)

The game device may further include a determination unit for determining whether a predetermined game condition has been satisfied for each of the first control objects. The first image generation unit generates a first game image obtained by superimposing at least a portion of the captured image on the game image corresponding to each first control object for which the predetermined game condition has been satisfied.

With the configuration (11) above, when a predetermined game condition is satisfied for a first control object, the captured image (at least a portion thereof) is displayed, on the predetermined display device, superimposed on the game image corresponding to the first control object. Therefore, it is possible to present, to the players, which first control object has satisfied a predetermined game condition, in an easy-to-understand manner.

Moreover, the configuration (9) above and the configuration (11) above may be combined with each other. That is, the game device may store the captured image, which has been obtained at the point in time when the predetermined game condition is satisfied, and include at least a portion of the captured image in the first game image (or an image generated from the captured image at the point in time when the predetermined game condition is satisfied may be included in the first game image). Then, the game system can display the facial expression of the player at the point in time when a predetermined game condition is satisfied. Therefore, where the predetermined game condition is satisfied at different points in time for different first control objects, it is possible to present the facial expression of a different player for each of the points in time.

(12)

Another example game system described in the present specification includes a portable display device, and a game device. The portable display device includes an image-capturing unit, and a display unit. The game device includes a data obtaining unit, an action control unit, a first image generation unit, a second image generation unit, a first image output unit, and a second image output unit.

The data obtaining unit obtains operation data representing an operation performed on the portable display device, and a captured image captured by the image-capturing unit. The action control unit controls an action of a predetermined control object based on the operation data in a virtual space. The first image generation unit generates a first game image which includes a game image that represents the virtual space and corresponds to the control object, and at least a portion of the captured image. The second image generation unit generates a second game image that represents the virtual space and corresponds to the control object. The first image output unit outputs the first game image to a predetermined display device separate from the portable display device. The second image output unit outputs the second game image to the portable display device.

With the configuration (12) above, as with the configuration (1) above, a game device 3 generates the first game image which includes at least a portion of the captured image captured by the portable display device. Then, the first game image is displayed on the predetermined display device different from the portable display device. Therefore, with the configuration (12) above, as with the configuration (1) above, images of the player during gameplay can be presented also to people other than the player who is using the portable display device, by means of the predetermined display device. For example, where the portable display device captures an image of the face of the player, people other than the player can also enjoy watching the facial expression of the player during gameplay.

The present specification discloses an example game device included in the game system of the configurations (1) to (12), and an example non-transitory computer-readable storage medium storing a game program to be executed by a computer to cause the computer to serve as various units (which may not include the data obtaining unit and the image output units) of the game device. The present specification also discloses an example game process method (image generation method) to be carried out in the game system or the game device of the configurations (1) to (14).

As described above, with the game system, the game device, the game program and the image generation method set forth above, it is possible to display a captured image (at least a portion thereof) captured by the portable display device on a predetermined display device different from a portable display device so that the image of the player during gameplay can be presented also to people other than the player who is using the portable display device.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Overall Configuration of Game System]

Figure 1:
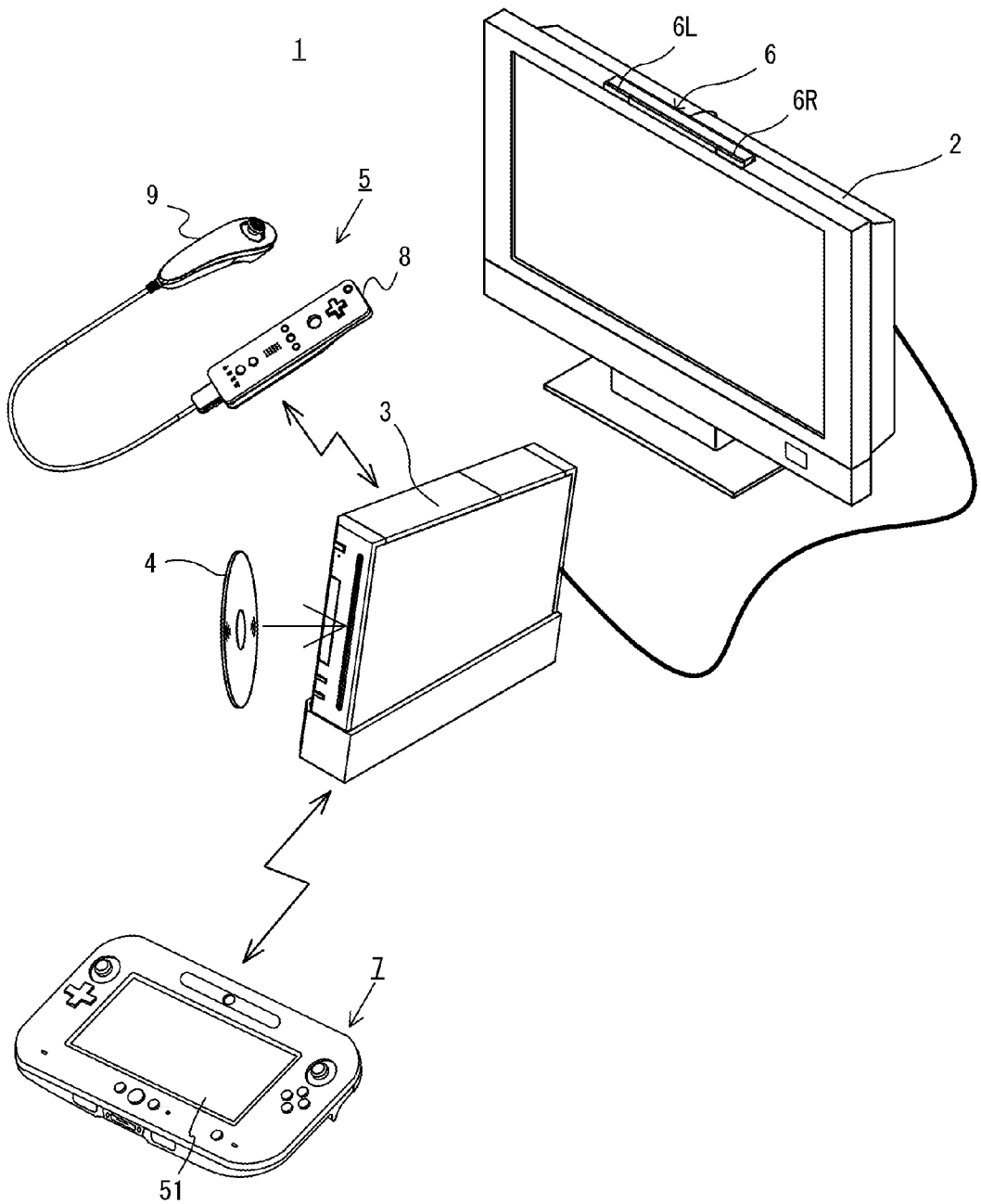
FIG. 1 is an external view of an example non-limiting game system.

A game system 1 according to an example embodiment will now be described with reference to the drawings. FIG. 1 is an external view of the game system 1. In FIG. 1, a game system 1 includes a stationary display device (hereinafter referred to as a "television") 2 such as a television receiver, a stationary game device 3, an optical disc 4, a controller 5, a marker device 6, and a terminal device 7. In the game system 1, a game device 3 performs game processes based on game operations performed using the controller 5 and or the terminal device 7, and game images obtained through the game processes are displayed on the television 2 and/or the terminal device 7.

In the game device 3, the optical disc 4 typifying an information storage medium used for the game device 3 in a replaceable manner is removably inserted. An information processing program (a game program, for example) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2 is connected to the game device 3 by a connecting cord. Game images obtained as a result of the game processes performed by the game device 3 are displayed on the television 2. The television 2 includes a speaker 2a (see FIG. 2), and the speaker 2a outputs game sounds obtained as a result of the game process. In alternative example embodiments, the game device 3 and the stationary display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game device 3 for calculating the movement, position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected in a wired connection (or a wireless connection) to the game device 3, and the game device 3 is able to control the lighting of each infrared LED of the marker device 6. Note that the marker device 6 is of a transportable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game device 3 with operation data representing the contents of operations performed on the controller itself. In the present example embodiment, the controller 5 includes a main controller 8 and a sub-controller 9, and a sub-controller 9 is detachably attached to the main controller 8. The controller 5 and the game device 3 can wirelessly communicate with each other. In the present example embodiment, the wireless communication between the controller 5 and the game device 3 uses, for example, Bluetooth (Registered Trademark) technology. In other example embodiments, the controller 5 and the game device 3 may be connected by a wired connection. Furthermore, in FIG. 1, the game system 1 includes only one controller 5, but the game system 1 may include a plurality of controllers 5. That is, the game device 3 is capable of communicating with a plurality of controllers, so that by using a predetermined number of controllers at the same time, a plurality of people can play the game. The configuration of the controller 5 will be described in detail later.

The terminal device 7 is portable and is of a size that can be held by the user. The user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 74 to be described later). The terminal device 7 can communicate with the game device 3 wirelessly (or wired). The terminal device 7 receives data for images generated by the game device 3 (e.g., game images) from the game device 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the contents of operations performed thereon to the game device 3.

[2. Internal Configuration of Game Device 3]

Figure 2:
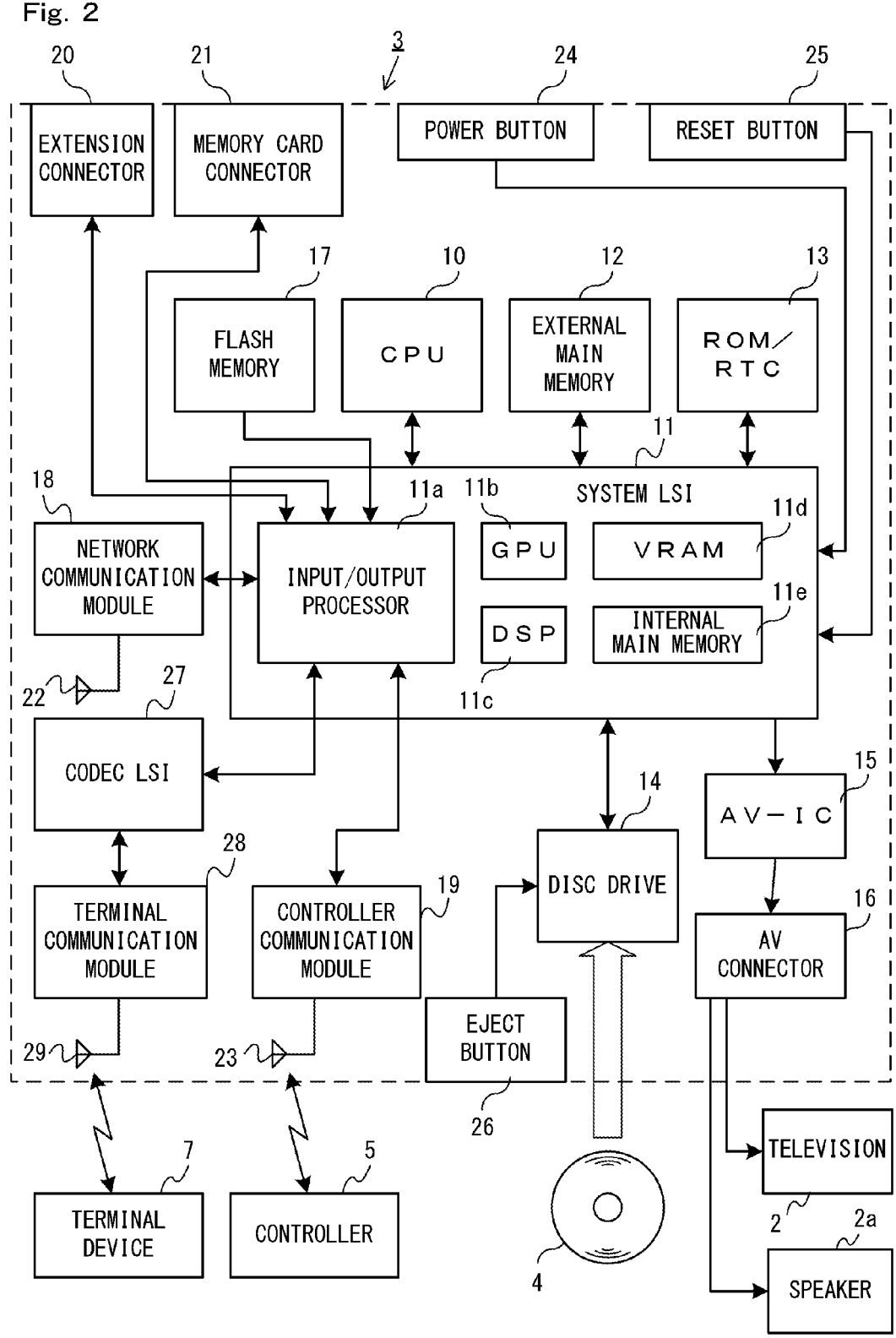
FIG. 2 is a block diagram showing an internal configuration of an example non-limiting game device.

An internal configuration of the game device 3 will be described with reference to FIG. 2. FIG. 2 is a block diagram illustrating an internal configuration of the game device 3. The game device 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, obtaining data from an external device(s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11*b*, acting as a part of a rendering unit, generates images in accordance with graphics commands (rendering commands) from the CPU 10. The VRAM 11*d* stores data (data such as polygon data and texture data) used by the GPU 11*b* to execute the graphics commands. When images are generated, the GPU 11*b* generates image data using data stored in the VRAM 11*d*. Note that in the present example embodiment, the game device 3 generates both images (game images) to be displayed on the television 2 and images (game images) to be displayed on the terminal device 7. Hereinafter, the images to be displayed on the television 2 are referred to as the "television images" and the images to be displayed on the terminal device 7 are referred to as the "terminal images".

The DSP 11*c*, functioning as an audioprocessor, generates sound data using sound data and sound waveform (e.g., tone quality) data stored in one or both of the internal main memory 11*e* and the external main memory 12. Note that in the present example embodiment, sounds (game sounds) to be generated are classified into two types as in the case of the game images, one being outputted by the speaker of the television 2, the other being outputted by speakers of the terminal device 7. Hereinafter, in some cases, the sounds to be outputted by the television 2 are referred to as "television sounds", and the sounds to be outputted by the terminal device 7 are referred to as "terminal sounds".

Among the images and sounds generated by the game device 3 as described above, both image data and sound data to be outputted by the television 2 are read out by the AV-IC 15. The AV-IC 15 outputs the read-out image data to the television 2 via an AV connector 16, and outputs the read-out sound data to the speaker 2*a* provided in the television 2. Thus, images are displayed on the television 2, and sounds are outputted by the speaker 2*a*. While the connection scheme between the game device 3 and the television 2 may be any scheme, the game device 3 may transmit control commands for controlling the television 2 to the television 2 via a wired connection or a wireless connection. For example, an HDMI (High-Definition Multimedia Interface) cable in conformity with the HDMI standard may be used. In the HDMI standard, it is possible to control the connected device by a function called CEC (Consumer Electronics Control). Thus, in a case in which the game device 3 can control the television 2, as when an HDMI cable is used, the game device 3 can turn ON the power of the television 2 or switch the input of the television 2 from one to another at any point in time.

Furthermore, among the images and sounds generated by the game device 3, both image data and sound data to be outputted by the terminal device 7 are transmitted to the terminal device 7 by the input/output processor 11*a*, etc. The data transmission to the terminal device 7 by the input/output processor 11*a*, etc., will be described later.

The input/output processor 11*a* exchanges data with components connected thereto, and downloads data from an external device (s). The input/output processor 11*a* is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 is capable of connecting to a network such as the Internet to communicate with external information processing devices (e.g., other game devices and various servers). Specifically, the input/output processor 11*a* can be connected to a network such as the Internet via the network communication module 18 and the antenna 22, and can communicate with other devices connected to the network. The input/output processor 11*a* regularly accesses the flash memory 17, and detects the presence or absence of any data to be transmitted to the network, and when detected, transmits the data to the network via the network communication module 18 and the antenna 22. Further, the input/output processor 11*a* receives data transmitted from the external information processing devices and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and the external information processing devices. Moreover, the flash memory 17 may have a game program stored therein.

Furthermore, the game device 3 is capable of receiving operation data from the controller 5. Specifically, the input/output processor 11*a* receives operation data transmitted from the controller 5 via the antenna 23 and the controller communication module 19, and stores it (temporarily) in a buffer area of the internal main memory 11*e* or the external main memory 12.

Furthermore, the game device 3 is capable of exchanging data, for images, sound, etc., with the terminal device 7. When transmitting game images (terminal game images) to the terminal device 7, the input/output processor 11*a* outputs game image data generated by the GPU 11*b* to the codec LSI 27. The codec LSI 27 performs a predetermined compression process on the image data from the input/output processor 11*a*. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game device 3 to the terminal device 7 is image data used in a game, and the playability of a game can be adversely influenced if there is a delay in the images displayed in the game. Therefore, delay may be avoided as much as possible in transmitting image data from the game device 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game device 3 also transmits sound data to the terminal device 7. Specifically, the input/output processor 11*a* outputs sound data generated by the DSP 11*c* to the terminal communication module 28 via the codec LSI 27. The codec LSI 27 performs a compression process on the sound data as it does on the image data. While the method for compressing the sound data may be any method, it may be a method with a high compression rate and little sound degradation. Also, in another example embodiment, the sound data may be transmitted without compression. The terminal communication module 28 transmits compressed image and sound data to the terminal device 7 via the antenna 29.

Furthermore, in addition to the image and sound data, the game device 3 transmits various control data to the terminal device 7 where appropriate. The control data is data representing an instruction to control a component included in the terminal device 7, e.g., an instruction to control lighting of a marker unit (a marker unit 55 shown in FIG. 12) or an instruction to control shooting by a camera (a camera 56 shown in FIG. 12). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game device 3 to the terminal device 7 may or may not be coded depending on the situation.

Furthermore, the game device 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game device 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game device 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied from an external power source to the components of the game device 3 via an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other example embodiments, some of the components of the game device 3 may be provided as extension devices separate from the game device 3. In this case, an extension device may be connected to the game device 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game device which does not include the above components, the game device can communicate with the terminal device 7.

[3. Configuration of Controller 5]

Figure 3:
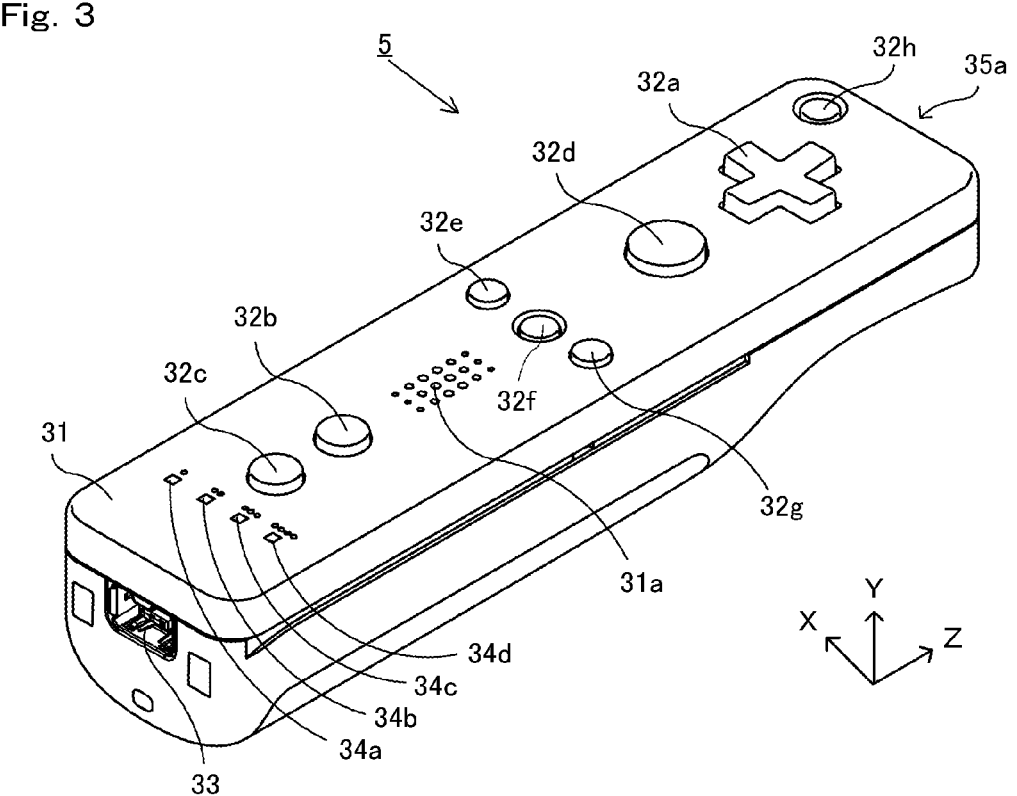
FIG. 3 is a perspective view showing an external configuration of an example non-limiting controller.
Figure 4:
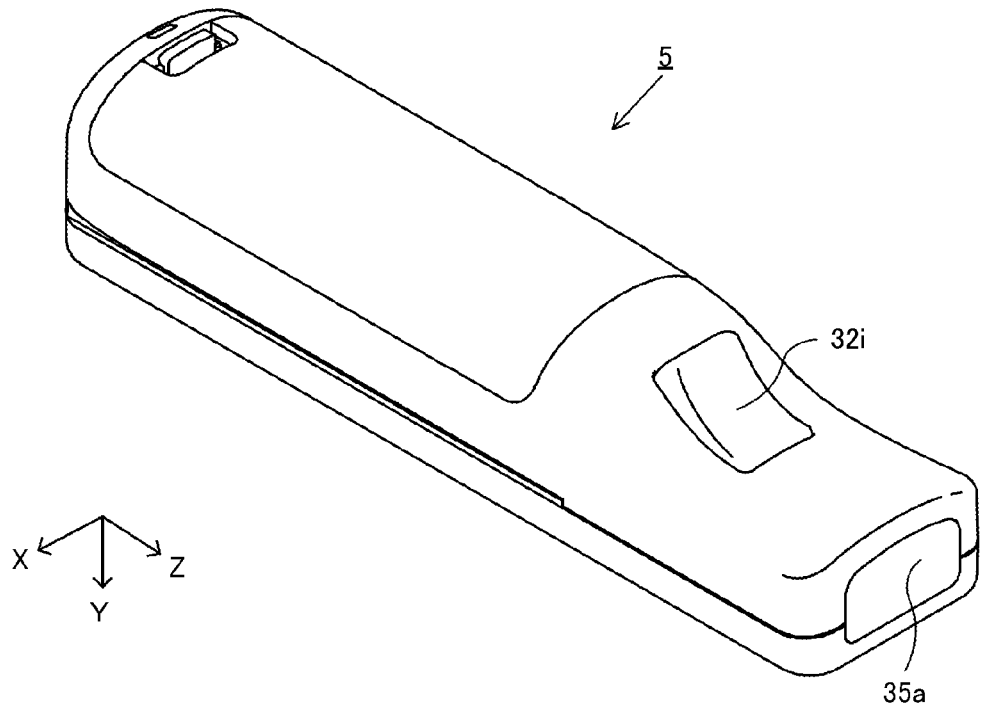
FIG. 4 is a perspective view showing an external configuration of the example non-limiting controller.

Next, with reference to FIGS. 3 to 7, the controller 5 will be described. As described above, the controller 5 includes the main controller 8 and the sub-controller 9. FIG. 3 is a perspective view illustrating an external configuration of the main controller 8. FIG. 4 is a perspective view illustrating an external configuration of the main controller 8. The perspective view of FIG. 3 shows the main controller 8 as viewed from the top rear side thereof, and the perspective view of FIG. 4 shows the main controller 8 as viewed from the bottom front side thereof.

As shown in FIG. 3 and FIG. 4, the main controller 8 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the main controller 8, and moving the main controller 8 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game device 3. Further, the power button 32h is intended to remotely turn ON/OFF the game device 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the main controller 8 to another device (e.g., the sub-controller 9 or another sensor unit). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 (the main controller 8) is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The main controller 8 has an image-capturing/processing unit 35 (FIG. 6), and a light incident surface 35a through which a light is incident on the image-capturing/processing unit 35 is provided on the front surface of the housing 31, as shown in FIG. 4. The light incident surface 35a is made of a material transmitting therethrough at least infrared light outputted by the markers 6R and 6L.

On the top surface of the housing 31, sound holes 31a for externally outputting a sound from a speaker 47 (shown in FIG. 5) incorporated in the main controller 8 is provided between the first button 32b and the home button 32f.

Figure 5:
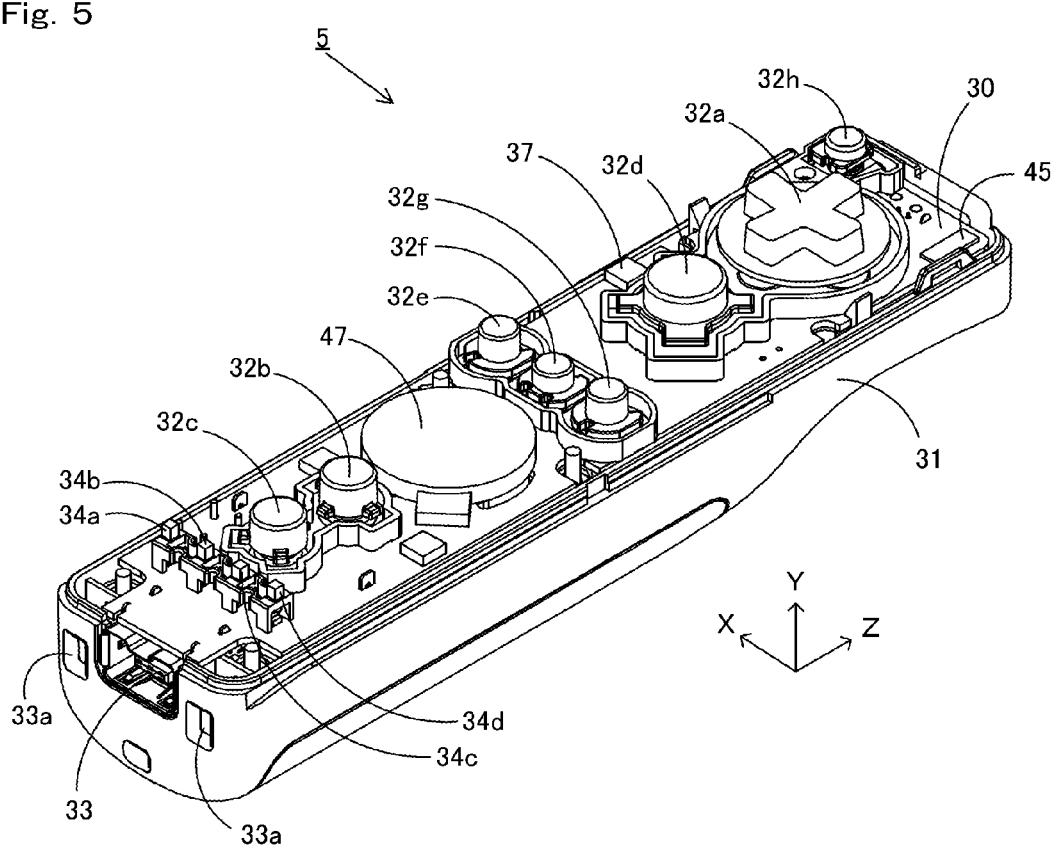
FIG. 5 is a diagram showing an internal configuration of the example non-limiting controller.
Figure 6:
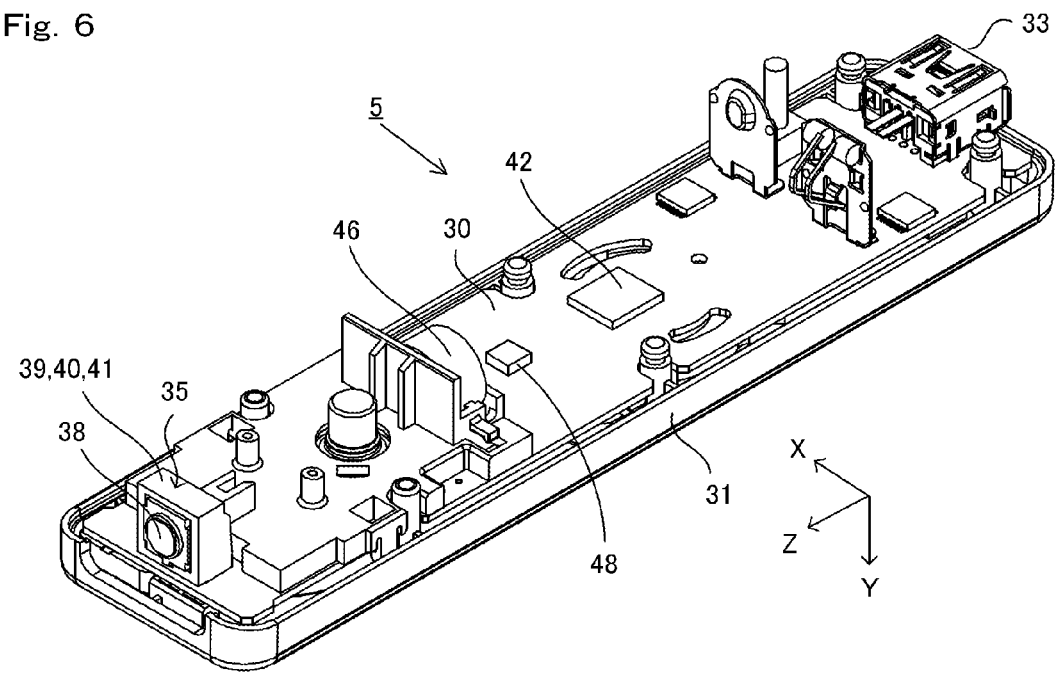
FIG. 6 is a diagram showing an internal configuration of the example non-limiting controller.

Next, with reference to FIGS. 5 and 6, an internal configuration of the main controller 8 will be described. FIGS. 5 and 6 are diagrams illustrating the internal configuration of the main controller 8. FIG. 5 is a perspective view illustrating a state where an upper casing (a part of the housing 31) of the main controller 8 is removed. FIG. 6 is a perspective view illustrating a state where a lower casing (a part of the housing 31) of the main controller 8 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 47, and the like are provided. These elements are connected to a microcomputer 42 (see FIG. 6) via lines (not shown) formed on the substrate 30 and the like. In the present example embodiment, an acceleration sensor 37 is provided on a position offset from the center of the main controller 8 with respect to the X-axis direction. Thus, calculation of the movement of the main controller 8 being rotated about the Z-axis may be facilitated. Further, the acceleration sensor 37 is provided anterior to the center of the main controller 8 with respect to the longitudinal direction (Z-axis direction). Further, a wireless module 44 (see FIG. 6) and the antenna 45 allow the controller 5 (the main controller 8) to act as a wireless controller.

On the other hand, as shown in FIG. 6, at a front edge of a bottom main surface of the substrate 30, the image-capturing/processing unit 35 is provided. The image-capturing/processing unit 35 includes an infrared filter 38, a lens 39, an image-capturing element 40 and an image processing circuit 41 located in order, respectively, from the front of the main controller 8. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The main controller 8 is vibrated by actuation of the vibrator 46 based on a command from the microcomputer 42. Therefore, the vibration is conveyed to the user's hand holding the main controller 8, and thus a so-called vibration-feedback game is realized. In the present example embodiment, the vibrator 46 is disposed slightly toward the front of the housing 31. That is, the vibrator 46 is positioned offset from the center toward the end of the main controller 8, and therefore the vibration of the vibrator 46 can lead to enhancement of the vibration of the entire main controller 8. Further, the connector 33 is provided at the rear edge of the bottom main surface of the substrate 30. In addition to the components shown in FIGS. 5 and 6, the main controller 8 includes a quartz oscillator for generating a reference clock of the microcomputer 42, an amplifier for outputting a sound signal to the speaker 47, and the like.

Figure 7:
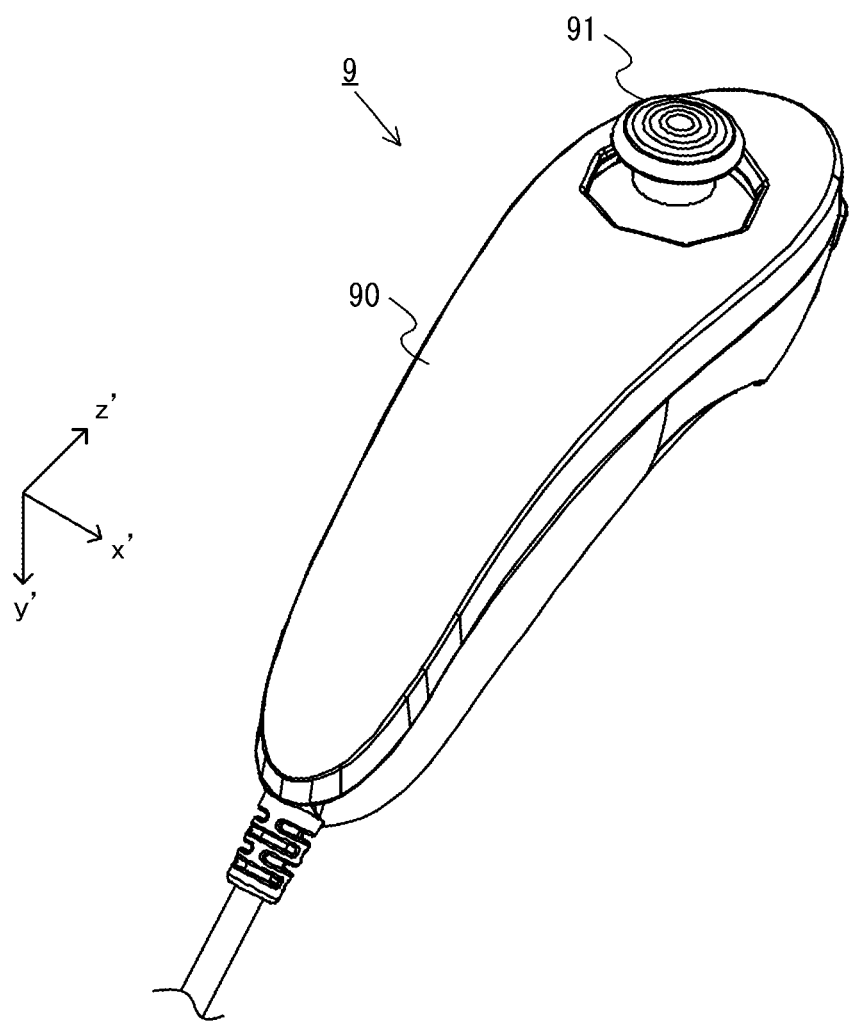
FIG. 7 is a block diagram showing a configuration of the example non-limiting controller.

FIG. 7 is a perspective view illustrating an external configuration of the sub-controller 9. The sub-controller 9 includes a housing 90 formed by, for example, plastic molding. As with the main controller 8, the housing 90 is sized as a whole to be held by a hand of an adult or a child. In the case of using the sub-controller 9 also, the player can perform game operations by operating buttons and sticks and changing the position and the direction of the sub-controller.

As shown in FIG. 7, the housing 90 has an analog joy stick 91 provided at the tip side (the z'-axis positive direction side) on the upper surface (the surface on the y'-axis negative direction side). Although not shown, the tip of the housing 90 has a surface slightly inclined backward, and a C button and a Z button are provided at the tip surface so as to be arranged vertically (the y-axis direction shown in FIG. 3). The analog joy stick 91 and these buttons (the C button and the Z button) are appropriately assigned their functions in accordance with game programs to be executed by the game device 3. Note that in some cases, an analog joystick 91 and these buttons may be collectively referred to as an "operating unit 92 (see FIG. 8)".

Although not shown in FIG. 7, the sub-controller 9 also includes an acceleration sensor (acceleration sensor 93 shown in FIG. 8) inside the housing 90. In the present example embodiment, an acceleration sensor 93 is of the same type as the acceleration sensor 37 of the main controller 8. However, the acceleration sensor 93 may be of a different type from the acceleration sensor 37 and may detect acceleration about, for example, a predetermined one axis or two axes.

Furthermore, as shown in FIG. 7, the housing 90 is connected at the rear to one end of a cable. Although not shown in FIG. 7, the other end of the cable is attached to a connector (connector 94 shown in FIG. 8). The connector can be attached to the connector 33 of the main controller 8. That is, by attaching the connector 33 to the connector 94, the main controller 8 is attached to the sub-controller 9.

Note that FIGS. 3 to 7 only show examples of the shapes of the main controller 8 and the sub-controller 9, the shape of each operation button, the number and the positions of acceleration sensors and vibrators, and so on, and other shapes, numbers, and positions may be employed. Further, although in the present example embodiment, the imaging direction of the image-capturing means of the main controller 8 is the Z-axis positive direction, the imaging direction may be any direction. That is, the image-capturing/processing unit 35 (the light incident surface 35a through which a light is incident on the image-capturing/processing unit 35) of the controller 5 may not necessarily be provided on the front surface of the housing 31, but may be provided on any other surface on which a light can be received from the outside of the housing 31.

Figure 8:
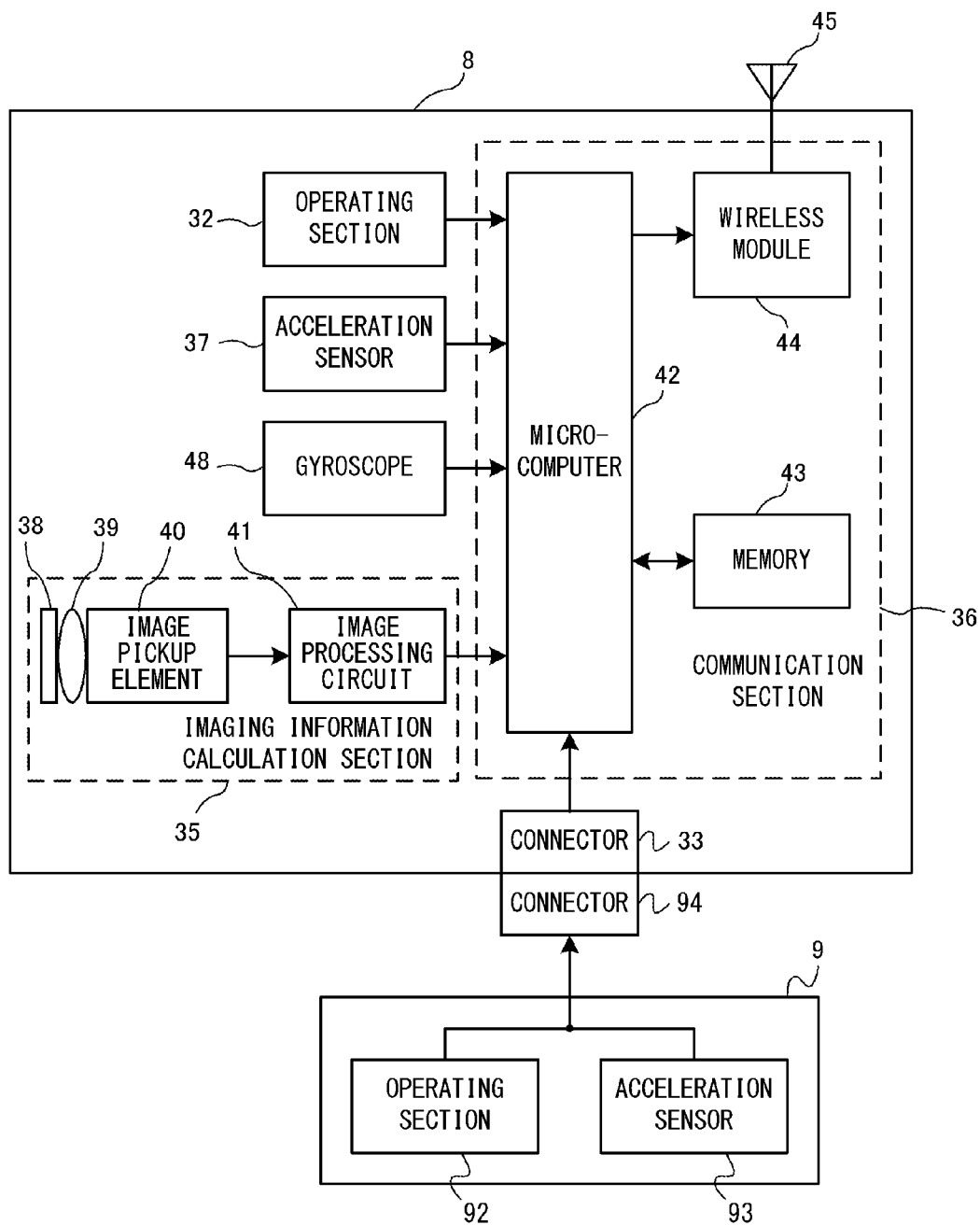
FIG. 8 is a diagram showing an external configuration of an example non-limiting terminal device.

FIG. 8 is a block diagram illustrating a configuration of the controller 5. As shown in FIG. 8, the main controller 8 includes an operating unit 32 (the operation buttons 32a to 32i), the image-capturing/processing unit 35, a communication unit 36, the acceleration sensor 37, and a gyroscope 48. The sub-controller 9 includes an operating unit 92 and an acceleration sensor 93. The controller 5 transmits, as operation data, data representing the content of an operation performed on the controller 5 itself, to the game device 3. Note that hereinafter, in some cases, operation data transmitted by the controller 5 is referred to as "controller operation data", and operation data transmitted by the terminal device 7 is referred to as "terminal operation data".

The operating unit 32 includes the operation buttons 32a to 32i described above, and outputs, to the microcomputer 42 of the communication unit 36, operation button data indicating an input state (that is, whether or not each operation button 32a to 32i is pressed) of each operation button 32a to 32i.

The image-capturing/processing unit 35 is a system for analyzing image data taken by the image-capturing means and calculating, for example, the centroid and the size of an area having a high brightness in the image data. The image-capturing/processing unit 35 has a maximum sampling period of, for example, about 200 frames/sec., and therefore can trace and analyze even a relatively fast motion of the controller 5.

The image-capturing/processing unit 35 includes the infrared filter 38, the lens 39, the image-capturing element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image-capturing element 40. The image-capturing element 40 is a solid-state imaging device such as, for example, a CMOS sensor or a CCD sensor, which receives the infrared light collected by the lens 39, and outputs an image signal. The marker unit 55 of the terminal device 7 and the marker device 6, which are subjects to be imaged, include markers for outputting infrared light. Therefore, the infrared filter 38 enables the image-capturing element 40 to receive only the infrared light transmitted through the infrared filter 38 and generate image data, so that an image of each subject to be imaged (the marker unit 55 and/or the marker device 6) can be taken with enhanced accuracy. The image taken by the image-capturing element 40 is processed by the image processing circuit 41. The image processing circuit 41 calculates, in the captured image, the positions of subjects to be imaged. The image processing circuit 41 outputs data representing coordinate points of the calculated positions, to the microcomputer 42 of the communication unit 36. The data representing the coordinate points is transmitted as operation data to the game device 3 by the microcomputer 42. Hereinafter, the coordinate points are referred to as "marker coordinate points". The marker coordinate point changes depending on the attitude (angle of tilt) and/or the position of the controller 5 itself, and therefore the game device 3 is allowed to calculate the attitude and the position of the controller 5 using the marker coordinate point.

In another example embodiment, the controller 5 may not necessarily include the image processing circuit 41, and the controller 5 may transmit the captured image as it is to the game device 3. At this time, the game device 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection unit of the acceleration sensor 37 in the straight line direction along the sensing axis direction, among all accelerations applied to a detection unit of the acceleration sensor 37. For example, a multiaxial acceleration sensor having two or more axes detects an acceleration of a component for each axis, as the acceleration applied to the detection unit of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication unit 36. The acceleration detected by the acceleration sensor 37 changes depending on the attitude (angle of tilt) and the movement of the controller 5, and therefore the game device 3 is allowed to calculate the attitude and the movement of the controller 5 using the obtained acceleration data. In the present example embodiment, the game device 3 calculates the attitude, angle of tilt, etc., of the controller 5 based on the obtained acceleration data.

When a computer such as a processor (e.g., the CPU 10) of the game device 3 or a processor (e.g., the microcomputer 42) of the controller 5 processes an acceleration signal outputted by the acceleration sensor 37 (or similarly from an acceleration sensor 73 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another suitable parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication unit 36. Alternatively, the gyroscope 48 may simply detect an angular rate about one axis or angular rates about two axes.

Furthermore, the operating unit 92 of the sub-controller 9 includes the analog joy stick 91, the C button, and the Z button. The operating unit 92 outputs stick data and operation button data to the main controller 8 via the connector 94, and the particular stick data and operation button data (referred to as "sub stick data" and "sub operation button data", respectively) outputted by the operating unit 92 represent the direction and the amount of tilt of the analog stick 91 and the state of input with each button (as to whether the button has been pressed or not).

Furthermore, the acceleration sensor 93 of the sub-controller 9 is of the same type as the acceleration sensor 37 of the main controller 8, and detects accelerations (including a gravitational acceleration) of the sub-controller 9, i.e., force (including gravity) applied to the sub-controller 9. Among all accelerations applied to a detection unit of the acceleration sensor 38, the acceleration sensor 93 detects values for accelerations (linear accelerations) linearly applied along three predetermined axial directions. Data representing the detected accelerations (referred to as "sub acceleration data") is outputted to the main controller 8 via the connector 94.

In this manner, the sub-controller 9 outputs sub-controller data, including the sub stick data, the sub operation button data, and the sub acceleration data, to the main controller 8.

The communication unit 36 of the main controller 8 includes the microcomputer 42, memory 43, the wireless module 44 and the antenna 45. The microcomputer 42 controls the wireless module 44 for wirelessly transmitting, to the game device 3, data obtained by the microcomputer 42 while using the memory 43 as a storage area in the process.

The sub-controller data from the sub-controller 9 is inputted to the microcomputer 42 and temporarily stored to the memory 43. In addition, data outputted by the operating unit 32, the image-capturing/processing unit 35, the acceleration sensor 37, and the gyroscope 48 to the microcomputer 42 (referred to as "main controller data") is temporarily stored to the memory 43. Both the main controller and the sub-controller data are transmitted to the game device 3 as operation data (controller operation data). Specifically, at the time of the transmission to the controller communication module 19 of the game device 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game device 3 receives the low power radio wave signal. The game device 3 demodulates or decodes the received low power radio wave signal to obtain the operation data. The CPU 10 of the game device 3 performs the game process using the operation data obtained from the controller 5. The wireless transmission from the communication unit 36 to the controller communication module 19 is sequentially performed at a predetermined time interval. Since the game process is generally performed at a cycle of 1/60 sec. (corresponding to one frame time), data may be transmitted at a cycle of a shorter time period. The communication unit 36 of the controller 5 outputs, to the controller communication module 19 of the game device 3, the operation data at intervals of 1/200 seconds, for example.

As described above, the main controller 8 can transmit marker coordinate data, acceleration data, angular rate data, and operation button data as operation data representing operations performed thereon. The sub-controller 9 can transmit acceleration data, stick data, and operation button data as operation data representing operations performed thereon. In addition, the game device 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the main controller 8 and/or the sub-controller 9 to arbitrary attitudes, pointing the main controller 8 to arbitrary positions on the screen, and moving the main controller 8 and/or the sub-controller 9.

Also, in the present example embodiment, the controller 5 is not provided with any display means for displaying game images, but the controller 5 may be provided with a display means for displaying an image or suchlike to indicate, for example, a remaining battery level.

[4. Configuration of Terminal Device 7]

Figure 9:
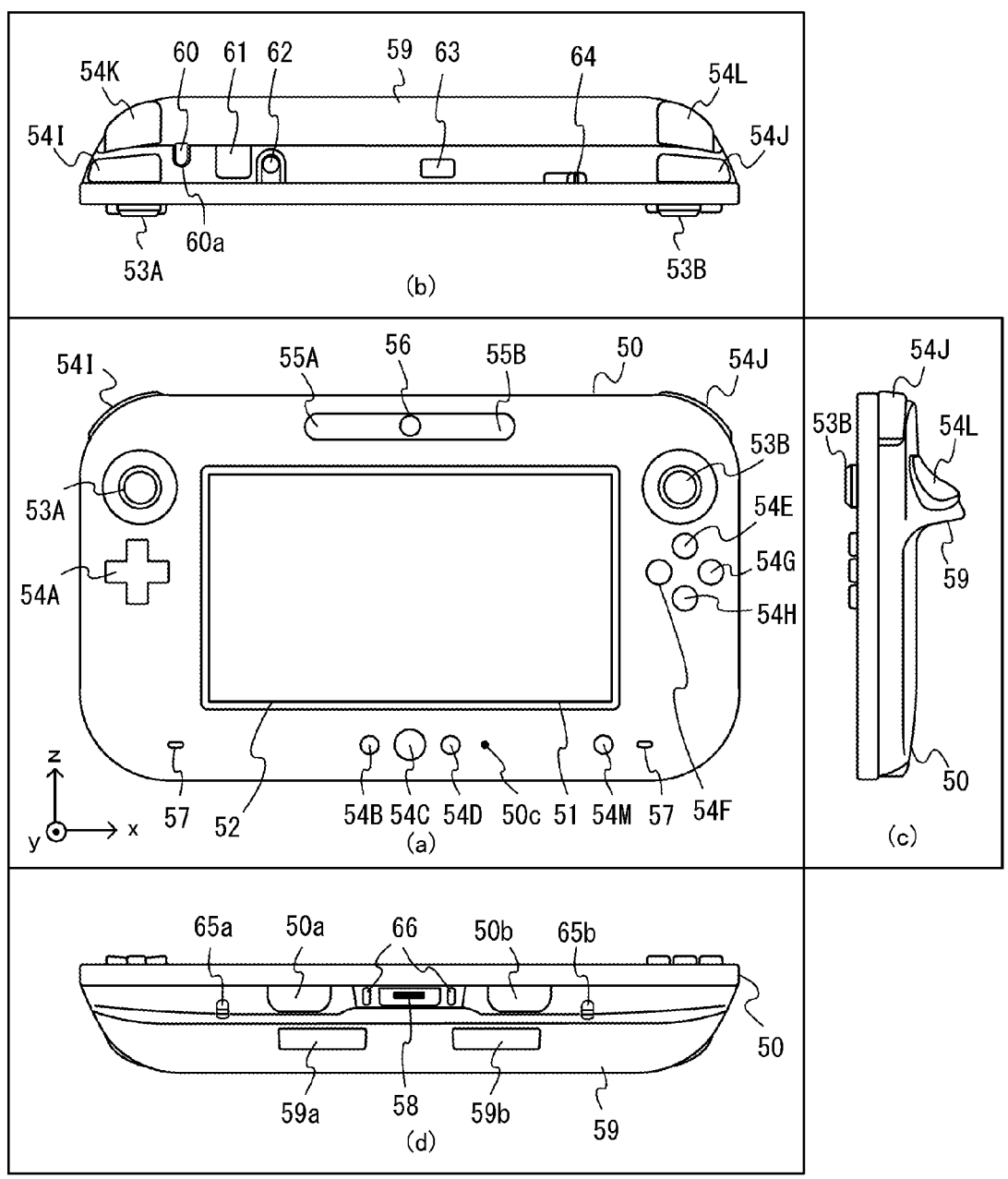
FIG. 9 is a diagram showing an external configuration of the example non-limiting terminal device.
Figure 10:
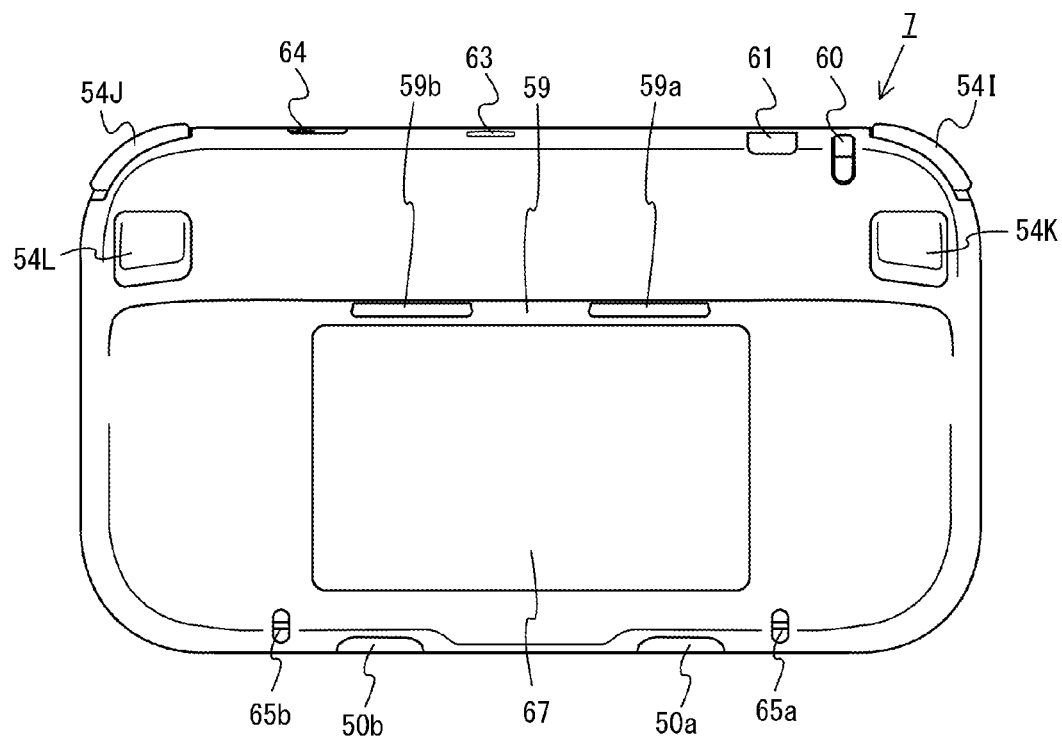
FIG. 10 is a back view of the example non-limiting terminal device.
Figure 11:
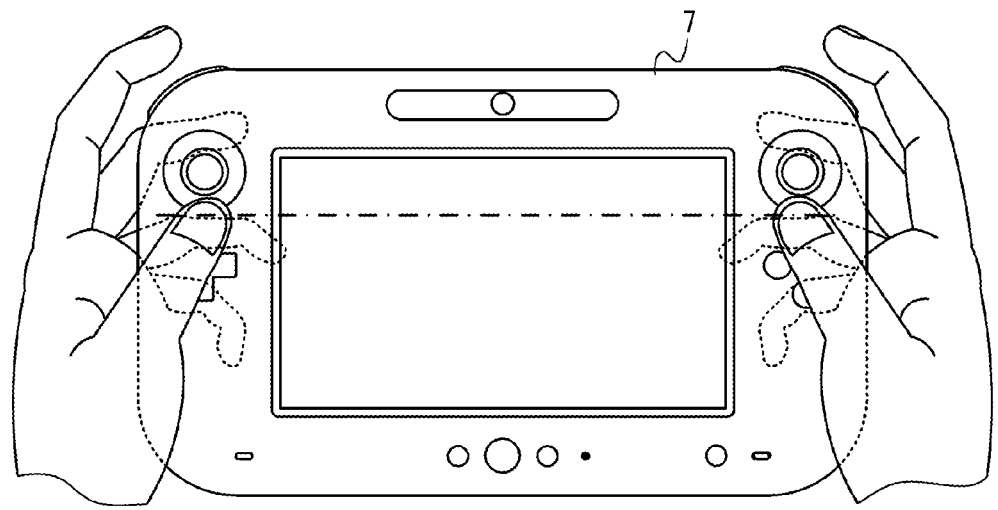
FIG. 11 is a diagram showing a user holding the example terminal device in a landscape position.

Next, a configuration of a terminal device 7 will be described with reference to FIGS. 9 to 12. FIG. 9 is a plan view showing an external configuration of the terminal device 7. FIG. 9(a) is a front view of the terminal device 7, FIG. 9(b) is a top view thereof, FIG. 9(c) is a right side view thereof, and FIG. 9(d) is a bottom view thereof. FIG. 10 is a back view of the terminal device 7. FIG. 11 is a diagram showing a user holding the terminal device 7 in a landscape position.

As shown in FIG. 9, the terminal device 7 includes a housing 50 generally in a horizontally-elongated rectangular plate shape. That is, it can also be said that the terminal device 7 is a tablet-type information processing device. The housing 50 may have a curved surface or may have some protrusions, etc., as long as it is generally in a plate shape. The housing 50 is sized so that it can be held by the user. Thus, the user can hold and move the terminal device 7, and can change the position in which the terminal device 7 is placed. The longitudinal (z-axis direction) length of the terminal device 7 is 100 to 150 [mm], for example, and is 133.5 [mm] in the present embodiment. The widthwise (x-axis direction) length of the terminal device 7 is 200 to 250 [mm], for example, and is 228.26 [mm] in the present embodiment. For example, the thickness (the length in the y-axis direction) of the terminal device 7 is about 15 to about 30 [mm] in a plate-shaped portion and about 30 to about 50 [mm] including the thickest part, and is 23.6 (40.26 in the thickest part) [mm] in the present embodiment. For example, the weight of the terminal device 7 is about 400 to about 600 [g], and is 530 [g] in the present embodiment. Although the details will be described later, the terminal device 7 is configured so that it is easily held and operated by the user even though it is such a relatively large terminal device (controller device) as described above.

The terminal device 7 includes an LCD 51 on the front surface (front side) of the housing 50. The size of the screen of the LCD 51 is 5 inches or larger, for example, and is herein 6.2 inches. The controller device 7 of the present embodiment has such a configuration that it is easily held and operated, and it is therefore easy to operate even if a large LCD is provided. In other embodiments, the controller device 7 may be of a relatively small size with the provision of a smaller LCD 51. The LCD 51 is provided near the center of the surface of the housing 50. Therefore, the user can hold and move the terminal device 7 while looking at the screen of the LCD 51 by holding opposing end portions of the housing 50 with respect to the LCD 51, as shown in FIG. 11. While FIG. 11 show an example in which the user holds the terminal device 7 in a landscape position (in a horizontally-oriented direction) by holding left and right opposing end portions of the housing 50 with respect to the LCD 51, the user can hold the terminal device 7 in a portrait position (in a vertically-oriented direction).

As shown in FIG. 9(a), the terminal device 7 includes a touch panel 52 on the screen of the LCD 51 as an operation mechanism. In the present embodiment, the touch panel 52 is a resistive-type touch panel. However, the touch panel is not limited to the resistive type, and may be a touch panel of any type including, for example, a capacitive type, etc. The touch panel 52 may be of a single-touch type or a multi-touch type. In the present embodiment, a touch panel having the same resolution (detection precision) as the resolution of the LCD 51 is used as the touch panel 52. However the resolution of the touch panel 52 does not always need to coincide with the resolution of the LCD 51. While a touch pen 60 is usually used for making inputs on the touch panel 52, the present invention is not limited to using the touch pen 60, and an input may be made on the touch panel 52 with a finger of the user. The housing 50 is provided with a hole 60a for accommodating the touch pen 60 used for performing operations on the touch panel 52 (see FIG. 9(b)). While the hole 60a is provided on the upper surface of the housing 50 so that the touch pen 60 does not fall, it may be provided on the side surface or the bottom surface. Thus, since the terminal device 7 includes the touch panel 52, the user can operate the touch panel 52 while moving the terminal device 7. That is, the user can move the screen of the LCD 51 while directly (by means of the touch panel 52) making an input on the screen.

As shown in FIG. 9, the terminal device 7 includes two analog sticks 53A and 53B and a plurality of buttons (keys) 54A to 54M, as operation mechanisms (operation sections). The analog sticks 53A and 53B are each a direction-specifying device. The analog sticks 53A and 53B are each configured so that the movable member (stick portion) operated with a finger of the user can be slid in any direction (at any angle in the up, down, left, right and diagonal directions) with respect to the surface of the housing 50. That is, it is a direction input device which is also called a slide pad. The movable member of each of the analog sticks 53A and 53B may be of such a type that it is tilted in any direction with respect to the surface of the housing 50. Since the present embodiment use analog sticks of such a type that the movable members slide, the user can operate the analog sticks 53A and 53B without significantly moving the thumbs, and therefore operations can be made while the housing 50 is held more firmly. When analog sticks of such a type that the movable members tilt are used as the analog sticks 53A and 53B, the degree of input (the degree of tilt) is better perceived by the user, thus allowing the user to more easily perform precise operations.

The left analog stick 53A is provided on the left side of the screen of the LCD 51, and the right analog stick 53B is provided on the right side of the screen of the LCD 51. Therefore, the user can make a direction-specifying input by using an analog stick with either the left or the right hand. As shown in FIG. 11, the analog sticks 53A and 53B are provided at such positions that the user can operate them while holding the left and right portions of the terminal device 7 (the left and right opposing end portions with respect to the LCD 51), and therefore the user can easily operate the analog sticks 53A and 53B even when holding and moving the terminal device 7.

The buttons 54A to 54L are operation mechanisms (operation sections) for making predetermined inputs, and are keys that can be pressed. As will be discussed below, the buttons 54A to 54L are provided at such positions that the user can operate them while holding the left and right portions of the terminal device 7 (see FIG. 11). Therefore, the user can easily operate these operation mechanisms even when holding and moving the terminal device 7.

As shown in FIG. 9(a), the cross button (direction-input button) 54A and the buttons 54B to 54H and 54M, of the operation buttons 54A to 54L, are provided on the front surface of the housing 50. That is, these buttons 54A to 54H and 54M are provided at positions at which they can be operated by the thumbs of the user (see FIG. 11).

The cross button 54A is provided on the left side of the LCD 51 and under the left analog stick 53A. That is, the cross button 54A is provided at such a position that it can be operated with the left hand of the user. The cross button 54A has a cross shape, and is a button with which it is possible to specify at least up, down, left and right directions.

The buttons 54B to 54D are provided on the lower side of the LCD 51. These three buttons 54B to 54D are provided at positions at which they can be operated with either the left or the right hand. The terminal device 7 includes the power button 54M for turning ON/OFF the power of the terminal device 7. The power of the game device 3 can be remotely turned ON/OFF by operating the power button 54M. The power button 54M is provided on the lower side of the LCD 51 as are the buttons 54B to 54D. The power button 54M is provided on the right side of the buttons 54B to 54D. Thus, the power button 54M is provided at a position at which it can be operated (easily operated) with the right hand. The four buttons 54E to 54H are provided on the right side of the LCD 51 and under the right analog stick 53B. That is, the four buttons 54E to 54H are provided at positions at which they can be operated with the right hand of the user. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

In the present embodiment, the analog sticks 53A and 53B are provided above the cross button 54A and the buttons 54E to 54H. Here, the analog sticks 53A and 53B protrude beyond the cross button 54A and the buttons 54E to 54H in the thickness direction (the y-axis direction). Therefore, if the positions of the analog stick 53A and the cross button 54A are reversed, the thumb of the user may inadvertently touch the analog stick 53A when the user is operating the cross button 54A with the thumb. A similar problem occurs also when the positions of the analog stick 53B and the buttons 54E to 54H are reversed. In contrast, in the present embodiment, since the analog sticks 53A and 53B are provided above the cross button 54A and the buttons 54E to 54H, the possibility that a finger may inadvertently touch the cross button 54A and the buttons 54E to 54H when the user is operating the analog sticks 53A and 53B is small. Thus, in the present embodiment, the possibility of erroneous operations can be reduced, and it is possible to improve the controllability of the terminal device 7. Note however that in other embodiments, the positions of the analog stick 53A and the cross button 54A may be reversed and the positions of the analog stick 53B and the buttons 54E to 54H may be reversed as necessary.

Here, in the present embodiment, some operation sections (the analog sticks 53A and 53B, the cross button 54A, and the three buttons 54E to 54G) are provided on the left and right opposing sides of the display section (the LCD 51) and above the center of the housing 50 in the up/down direction (y-axis direction). When operating these operation sections, the user primarily holds a portion of the terminal device 7 that is above the center thereof in the up/down direction. If the user holds the lower portion of the housing 50, the terminal device 7 to be held becomes unstable, making it more difficult for the user to hold the terminal device 7. In contrast, in the present embodiment, when operating the operation section, the user primarily holds a portion of the terminal device 7 that is above the center thereof in the up/down direction, and the housing 50 can be supported from the sides by the palms. Therefore, the user can stably hold the housing 50 and it is made easier to hold the terminal device 7, thus making it easier to operate the operation section. In other embodiments, operation sections are provided, at least one on the left and one on the right of the display section, above the center of the housing 50. For example, only the analog sticks 53A and 53B may be provided above the center of the housing 50. For example, in a case in which the cross button 54A is provided above the left analog stick 53A and the four buttons 54E to 54H are provided above the right analog stick 53B, the cross button 54A and the four buttons 54E to 54H may be provided above the center of the housing 50.

In the present embodiment, a projecting portion (an eaves portion 59) is provided on the back side of the housing 50 (the side opposite to the front surface where the LCD 51 is provided) (see FIGS. 9(c) and 10). As shown in FIG. 9(c), the eaves portion 59 is a mountain-shaped member which is projecting from the back surface of the generally plate-shaped housing 50. The projecting portion has such a height (thickness) that it can rest on fingers of the user holding the back surface of the housing 50. The height of the projecting portion is 10 to 25 [mm], for example, and is 16.66 [mm] in the present embodiment. The bottom surface of the projecting portion may have an inclination of 45° or more (or 60° or more) with respect to the back surface of the housing 50 so that the projecting portion easily rests on fingers of the user.

As shown in FIG. 9(c), the bottom surface of the projecting portion may have a larger inclination angle than the upper surface. As shown in FIG. 11, the user can hold the terminal device 7 stably without getting tired even if the terminal device 7 has a relatively large size by holding the terminal device 7 while resting fingers on the eaves portion 59 (placing the eaves portion 59 on the fingers). That is, the eaves portion 59 can be referred to as a supporting member by means of which the housing 50 is supported by fingers, and can be referred to also as a finger-resting portion.

The eaves portion 59 is provided above the center of the housing 50 with respect to the up/down direction. The eaves portion 59 is provided on the reverse side so as to generally correspond to the operation sections (the analog sticks 53A and 53B) which are provided on the front surface of the housing 50. That is, the projecting portion is provided so as to extend across an area on the reverse side including positions corresponding to the operation sections which are provided respectively on the left side and on the right side of the display section. Therefore, when operating the operation section, the user can hold the terminal device 7 so as to support the eaves portion 59 with the middle fingers or the ring fingers (see FIG. 11). Then, it is easier to hold the terminal device 7, and it is easier to operate the operation sections. In the present embodiment, since the projecting portion has an eaves-like shape extending in the left/right direction, the user can hold the terminal device 7 with the middle fingers or the ring fingers placed along the bottom surface of the projecting portion, making it easier to hold the terminal device 7. The eaves portion 59 is not limited to the shape extending in the horizontal direction as shown in FIG. 10, as long as it is formed so that it (i.e., a portion thereof that is projecting) extends in the left/right direction. In other embodiments, the eaves portion 59 may extend in a direction that is slightly inclined from the horizontal direction. For example, the eaves portion 59 may be provided so as to be inclined upwardly (or downwardly) from the left and right opposing end portions toward the center.

The present embodiment employs the eaves portion 59 having a shape of an eaves as the projecting portion formed on the back surface of the housing for the purpose of providing engagement holes to be described below in the eaves portion 59, but the projecting portion may have any other suitable shape. For example, in other embodiments, two projecting portions may be provided in the left and right opposing portions (with no projecting portion in the center of the left/right direction) on the back side of the housing 50 (see FIG. 29). In other embodiments, the cross-sectional shape (the shape along the cross section vertical to the x-axis direction) of the projecting portion may have an arched shape (which opens downward) so that the terminal device 7 can be more firmly supported by the fingers of the user (so that the projecting portion more firmly rests on the fingers).

The width of the projecting portion (the eaves portion 59) in the up/down direction may be of any value. For example, the projecting portion may be formed so as to extend to the top side of the housing 50. That is, the upper surface of the projecting portion may be formed at the same position as the side surface on the upper side of the housing 50. Then, the housing 50 has a 2-tiered structure with the thin lower side and the thick upper side. As described above, the housing 50 may include a down-facing surface (the bottom surface of the projecting portion) formed in the left and right opposing portions of the back surface. Then, the user can easily hold the controller device with fingers abutting against this surface. While the "down-facing surface" may be provided at any position on the back surface of the housing 50, it may be located above the center of the housing 50.

As shown in FIGS. 9(a), 9(b) and 9(c), a first L button 54I and a first R button 54J are provided respectively in the right and left opposing portions on the upper surface of the housing 50. In the present embodiment, the first L button 54I and the first R button 54J are provided on diagonally upper portions (the left upper portion and the right upper portion) of the housing 50. Specifically, the first L button 54I is provided at the left end of the upper side surface of the plate-like housing 50 so that it is exposed on the upper left side surface (in other words, it is exposed on both the upper and left side surfaces). The first R button 54J is provided at the right end of the upper side surface of the housing 50, and is exposed on the upper right side surface (in other words, it is exposed on both the upper and right side surfaces). Thus, the first L button 54I is provided at such a position that it can be operated with the left index finger of the user, and the first R button 54J is provided at such a position that it can be operated with the right index finger of the user (see FIG. 11). In other embodiments, the operation sections provided respectively in the left and right portions of the upper surface of the housing 50 do not have to be provided at the left end and the right end, and may be provided at positions other than the end portions. The operation sections may be provided respectively on the left and right side surfaces of the housing 50.

As shown in FIGS. 9(c) and 10, a second L button 54K and a second R button 54L are provided on the projecting portion (the eaves portion 59). The second L button 54K is provided near the left end of the eaves portion 59. The second R button 54L is provided near the right end of the eaves portion 59. Specifically, the second L button 54K is provided slightly toward the upper side in the left portion (the left portion as viewed from the front surface side) of the back surface of the housing 50, and the second R button 54L is provided slightly toward the upper side in the right portion (the right portion as viewed from the front surface side) of the back surface of the housing 50. In other words, the second L button 54K is provided on the reverse side so as to (generally) correspond to the left analog stick 53A provided on the front surface, and the second R button 54L is provided on the reverse side so as to (generally) correspond to the right analog stick 53B provided on the front surface. Thus, the second L button 54K is provided at a position at which it can be operated with the left middle finger (or left index finger) of the user, and the second R button 54L is provided at a position at which it can be operated with the right middle finger (or right index finger) of the user (see FIG. 11). The second L button 54K and the second R button 54L are provided on the upper surface of the eaves portion 59 as shown in FIG. 9(c). Therefore, the second L button 54K and the second R button 54L have upwardly-facing (diagonally-upwardly-facing) button surfaces. It is believed that the middle fingers or the index fingers will generally move in the up/down direction when the user holds the terminal device 7, and it will be easier for the user to press the second L button 54K and the second R button 54L if the button surfaces are facing upward.

As described above, in the present embodiment, operation sections (the analog sticks 53A and 53B) are provided respectively on the left side and the right side of the display section (the LCD 51) above the center of the housing 50, and other operation sections (the second L button 54K and the second R button 54L) are provided on the back side of the housing 50 so as to generally correspond respectively to the operation sections. Thus, since the operation sections and the other operation sections are provided on the front side and on the back side of the housing 50 so as to generally correspond to each other, the user can hold the housing 50 so as to sandwich the housing 50 from the front side and from the back side when operating these operation sections. When operating these operation sections, the user holds a portion of the housing 50 that is above the center thereof in the up/down direction, and therefore the terminal device 7 can be held in the upper portion thereof and the terminal device 7 can be supported by the palms (see FIG. 11). Thus, the user can stably hold the housing 50 in a state in which the user can operate at least four operation sections, and it is therefore possible to provide a controller device (the terminal device 7) which can be easily held by the user and which has a good controllability.

As described above, in the present embodiment, the user can easily hold the terminal device 7 by holding the terminal device 7 with fingers abutting against the bottom surface of the projecting portion (the eaves portion 59). Since the second L button 54K and the second R button 54L are provided on the upper surface of the projecting portion, the user can easily operate these buttons in such a state as described above. The user can easily hold the terminal device 7 in the following manner, for example.

That is, as shown in FIG. 11, the user can hold the terminal device 7 with the ring fingers abutting against the bottom surface of the eaves portion 59 (the one-dot-chain line shown in FIG. 11) (so as to support the eaves portion 59 with the ring fingers). Then, the user can operate the four buttons (the first L button 54I, the first R button 54J, the second L button 54K and the second R button 54L) with the index fingers and the middle fingers. For example, in a case in which required game operations are relatively complicated and many buttons are to be used, it is possible to easily operate many buttons by holding the terminal device 7 as shown in FIG. 11. Since the analog sticks 53A and 53B are provided above the cross button 54A and the buttons 54E to 54H, the user can advantageously operate the analog sticks 53A and 53B with the thumbs when relatively complicated operations are required. In FIG. 11, the user holds the terminal device 7 with the thumbs abutting against the front surface of the housing 50, the index fingers against the upper surface of the housing 50, the middle fingers against the upper surface of the eaves portion 59 on the back surface of the housing 50, the ring fingers against the bottom surface of the eaves portion 59, and the little fingers against the back surface of the housing 50. Thus, the user can firmly hold the terminal device 7 as if to wrap around the housing 50 from four directions.

The user can also hold the terminal device 7 with the middle fingers abutting against the bottom surface of the eaves portion 59. Then, the user can easily operate two buttons (the second L button 54K and the second R button 54L) with the index fingers. For example, in a case in which required game operations are relatively simple and only a few buttons are to be used, the terminal device 7 may be held with the middle fingers abutting against the bottom surface of the eaves portion 59. Then, since the user can hold the lower side of the housing 50 with two fingers (the ring finger and the little finger), it is possible to firmly hold the terminal device 7.

In the present embodiment, the eaves portion 59 is provided so that the bottom surface thereof is located between the analog sticks 53A and 53B and the cross button 54A and the four buttons 54E to 54H (so that it is located on the lower side of the analog sticks 53A and 53B and above the cross button 54A and the four buttons 54E to 54H). Therefore, in a case in which the terminal device 7 is held with the ring fingers abutting against the eaves portion 59 (FIG. 11), the analog sticks 53A and 53B can be easily operated with the thumbs, and in a case in which the terminal device 7 is held with the middle fingers abutting against the eaves portion 59, the cross button 54A and the four buttons 54E to 54H can be easily operated with the thumbs. That is, in either of the two cases, the user can make a direction input operation while firmly holding the terminal device 7.

As described above, the user can also hold the terminal device 7 in a portrait position. That is, the user can hold the terminal device 7 in a portrait position by holding the top side or the lower side of the terminal device 7 with one hand. Thus, since the user can hold the terminal device 7 with one hand, it is possible to for example perform an operation in which the terminal device 7 is held with one hand while an input is made to the touch panel 52 with the other hand.

In a case in which the top side of the terminal device 7 is held, the user can firmly hold the terminal device 7 by having fingers other than the thumbs abutting against the bottom surface of the eaves portion 59. In the present embodiment, since the eaves portion 59 extends in the left/right direction, the user can abut fingers other than the thumbs against the eaves portion 59 and firmly hold the terminal device 7, irrespective of the position along the top side of the terminal device 7 at which the user holds the terminal device 7. That is, in a case in which the terminal device 7 is used in a portrait position, the eaves portion 59 can be used as a grip. On the other hand, in a case in which the bottom side of the terminal device 7 is held with one hand, the user can operate the buttons 54B to 54D with that hand. Therefore, it is possible for example to operate the buttons 54B to 54D with the hand with which the terminal device 7 is held while making inputs to the touch panel 52 with the other hand, thereby allowing for more operations.

With the terminal device 7 of the present embodiment, since the projecting portion (the eaves portion 59) is provided on the back surface, if the terminal device 7 is put down with the screen of the LCD 51 (the front surface of the housing 50) facing up, the screen is slightly inclined. Therefore, the screen is more easily seen with the terminal device 7 put down. Input operations to the touch panel 52 are more easily performed with the terminal device 7 put down. In other embodiments, an additional projecting portion having generally the same height as the eaves portion 59 may be formed on the back surface of the housing 50. Then, with the screen of the LCD 51 facing up, the terminal device 7 can be put down so that the screen is horizontal with the projecting portions in contact with the floor surface. The additional projecting portion may be a removable (or foldable) member. Then, the terminal device can be put down with the screen either slightly inclined or with the screen horizontal. That is, in a case in which the terminal device 7 is put down and used, the eaves portion 59 can be used as a leg portion.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc. The terminal device 7 may include a button for turning ON/OFF the power of the LCD 51, and a button for performing a connection setting (pairing) with the game device 3.

As shown in FIG. 9(a), the terminal device 7 includes the marker section 55 including a marker 55A and a marker 55B on the front surface of the housing 50. The marker section 55 is provided on the upper side of the LCD 51. The marker 55A and the marker 55B are each formed by one or more infrared LEDs, as are the markers 6R and 6L of the marker device 6. The infrared LEDs of the markers 55A and 55B are provided inside a window portion that is transmissive to infrared light. The marker section 55 is used for the game device 3 to calculate the movement, etc., of the controller 5, as is the marker device 6 described above. The game device 3 can control the lighting of the infrared LEDs of the marker section 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 9, the camera 56 is provided on the front surface of the housing 50 in the present embodiment. That is, the camera 56 is provided so as to capture the image of the space in front of the display unit (the LCD 51) of the terminal device 7. Therefore, the camera 56 can capture an image of the face of the user holding the terminal device 7, and can capture an image of the user playing a game while looking at the LCD 51, for example. In the present embodiment, the camera 56 is provided between the two markers 55A and 55B.

The terminal device 7 includes a microphone 79 as a sound input mechanism. A microphone hole 50c is provided on the front surface of the housing 50. The microphone 79 is provided inside the housing 50 behind the microphone hole 50c. The microphone 79 detects sounds around the terminal device 7 such as the voice of the user.

The terminal device 7 includes a speaker 77 as a sound output mechanism. As shown in FIG. 9(d), speaker holes 57 are provided in a lower portion of the front surface of the housing 50. The output sounds from the speaker 77 are outputted from the speaker holes 57. In the present embodiment, the terminal device 7 includes two speakers, and the speaker holes 57 are provided at the respective positions of each of the left speaker and the right speaker. The terminal device 7 includes a knob 64 for adjusting the sound volume of the speaker 77. The terminal device 7 includes a sound output terminal 62 for receiving a sound output section such as an earphone connected thereto. Although the sound output terminal 62 and the knob 64 are provided on the upper side surface of the housing 50 considering the fact that the additional device is connected to the lower side surface of the housing, they may alternatively be provided on the left or right side surface or on the lower side surface.

The housing 50 includes a window 63 through which an infrared signal from an infrared communication module 82 is emitted to the outside of the terminal device 7. The window 63 is herein provided on the upper side surface of the housing 50 so that the infrared signal is emitted in a forward direction of the user when the user holds the opposing sides of the LCD 51. In other embodiments, the window 63 may be provided at any position such as, for example, on the back surface of the housing 50.

The terminal device 7 includes an extension connector 58 via which another device can be connected to the terminal device 7. The extension connector 58 is a communication terminal for exchanging data (information) with another device connected to the terminal device 7. In the present embodiment, the extension connector 58 is provided on the lower side surface of the housing 50 as shown in FIG. 9(d). The additional device connected to the extension connector 58 may be any device, and may be, for example, a game-specific controller (gun-shaped controller, etc.) or an input device such as a keyboard. The extension connector 58 may be omitted if there is no need to connect an additional device to terminal device 7. The extension connector 58 may include a terminal for supplying power to the additional device or a terminal for charging.

In addition to the extension connector 58, the terminal device 7 includes a charging terminal 66 for obtaining power from an additional device. When the charging terminal 66 is connected to a charging stand (not shown), power is supplied from the charging stand to the terminal device 7. In the present embodiment, the charging terminal 66 is provided on the lower side surface of the housing 50. Therefore, when the terminal device 7 and an additional device are connected to each other, it is possible to supply power from one to the other, in addition to exchanging information therebetween, via the extension connector 58. Thus, with the provision of the charging terminal 66 around (on the left and right opposing sides of) the extension connector 58, it is possible to supply power, as well as exchange information, when the terminal device 7 and an additional device are connected to each other. The terminal device 7 includes a charging connector, and the housing 50 includes a cover portion 61 for protecting the charging connector. The charging connector can be connected to a charger 86 to be described below, and power is supplied from the charger 86 to the terminal device 7 when the charging connector is connected to the charger. Although the charging connector (the cover portion 61) is provided on the upper side surface of the housing 50 in view of the fact that an additional device is connected to the lower side surface of the housing in the present embodiment, it may be provided on the left and right side surfaces or the lower side surface.

As shown in FIGS. 9(*d*) and 10, engagement holes 59*a* and 59*b* with which tab portions of an additional device can engage are provided on the bottom surface of the projecting portion (the eaves portion 59). The engagement holes 59*a* and 59*b* are used when connecting an additional device to the terminal device 7. That is, the additional device includes tab portions which can engage with the engagement holes 59*a* and 59*b*, and when connecting the additional device to the terminal device 7, the tab portions are engaged with the engagement holes 59*a* and 59*b*, thereby securing the terminal device 7 and the additional device with each other. Threaded holes may be further provided inside the engagement holes 59*a* and 59*b* so that the additional device can be securely fixed by screws. The projecting portion provided on the back surface of the terminal device 7 is herein the eaves portion 59 having an eaves-like shape. That is, the eaves portion 59 is provided so as to extend in the left/right direction. As shown in FIG. 10, the engagement holes 59*a* and 59*b* are provided near the center (with respect to the left/right direction) of the bottom surface of the eaves portion 59. While the number of the engagement holes 59*a* and 59*b* provided on the bottom surface of the eaves portion 59 is not limited to any particular number, if there is one engagement hole, it may be provided at the center of the eaves portion 59, and if there are a plurality of engagement holes, they may be provided in left-right symmetry. Then, the additional device can be stably connected while evenly maintaining the left-right balance. In a case in which the engagement holes are provided near the center, the size of the additional device can be reduced. Thus, the eaves portion 59 can be used as a member for engaging the additional device.

In the present embodiment, engagement holes 50*a* and 50*b* are provided on the bottom surface of the housing 50 as shown in FIG. 9(*d*). Therefore, in a case in which the additional device is connected to the terminal device 7, four tab portions are respectively engaged with four engagement holes, thereby securing the terminal device 7 and the additional device with each other. Thus, the additional device can be more securely connected to the terminal device 7. Threaded holes may be provided also inside the engagement holes 50*a* and 50*b* so that the additional device can be screwed thereto. While screwing may be done at any position, the support portion of the additional device, which lies against the reverse surface of the housing 50, and the eaves portion 59 may be screwed together, for example. In other embodiments, the engagement holes provided in the housing may be in any arrangement.

The terminal device 7 includes a battery cover 67 which can be attached to and removed from the housing 50. A battery (a battery 85 shown in FIG. 12) is placed inside the battery cover 67. In the present embodiment, the battery cover 67 is provided on the back side of the housing 50, below the projecting portion (the eaves portion 59).

The housing 50 of the terminal device 7 includes holes 65*a* and 65*b* through which a strap cord can be tied to the terminal device 7. As shown in FIG. 9(*d*), the holes 65*a* and 65*b* are provided on the bottom surface of the housing 50 in the present embodiment. Two holes 65*a* and 65*b* are provided in the present embodiment, one in the left portion and another in the right portion of the housing 50. Specifically, the hole 65*a* is provided on the left side of the center of the bottom surface of the housing 50, and the hole 65*b* is provided on the right side of the center of the bottom surface of the housing 50. The user can tie a strap to one of the holes 65*a* and 65*b*, and fasten the strap to the wrist of the user. Then, even if the user drops the terminal device 7 or if the terminal device 7 comes off the hand, the terminal device 7 is prevented from falling or hitting other objects. In the present embodiment, since the holes are provided both in the left and right portions, the user can conveniently fasten a strap to either hand.

With the terminal device 7 shown in FIGS. 9 to 12, the shape of each operation button, the shape of the housing 50, the number and the positions of the components, etc., are merely illustrative, and the present invention can be realized with other shapes, numbers, and positions.

Figure 12:
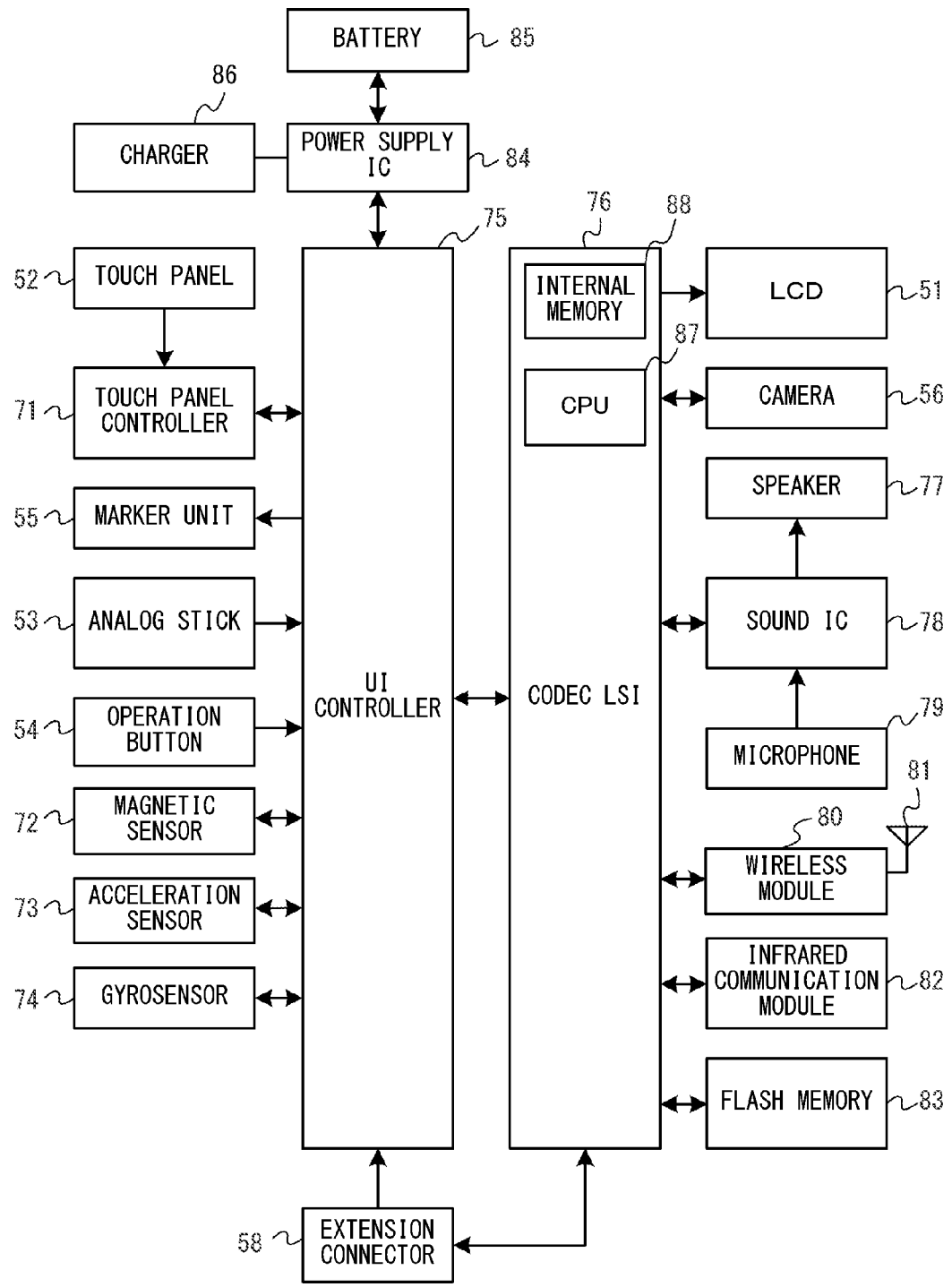
FIG. 12 is a block diagram showing an internal configuration of the example terminal device.

Next, an internal configuration of the terminal device 7 will be described with reference to FIG. 12. FIG. 12 is a block diagram showing an internal configuration of the terminal device 7. As shown in FIG. 12, in addition to the configuration shown in FIG. 9, the terminal device 7 includes a touch panel controller 71, a magnetic sensor 72, the acceleration sensor 73, the gyrosensor 74, a user interface controller (UI controller) 75, a codec LSI 76, the speaker 77, a sound IC 78, the microphone 79, a wireless module 80, an antenna 81, an infrared communication module 82, a flash memory 83, a power supply IC 84, and a battery 85. These electronic components are mounted on an electronic circuit board and accommodated in the housing 50.

The UI controller 75 is a circuit for controlling the input/output of data to/from various types of input/output sections. The UI controller 75 is connected to the touch panel controller 71, an analog stick 53 (the analog sticks 53A and 53B), an operation button 54 (the operation buttons 54A to 54L), the marker section 55, the magnetic sensor 72, the acceleration sensor 73, and the gyrosensor 74. The UI controller 75 is connected to the codec LSI 76 and the extension connector 58. The power supply IC 84 is connected to the UI controller 75, and power is supplied to various sections via the UI controller 75. The built-in battery 85 is connected to a power supply IC 84 to supply power. The charger 86 or a cable with which power can be obtained from an external power source can be connected to the power supply IC 84 via a charging connector, and the terminal device 7 can receive power supply from or be charged by an external power source using the charger 86 or the cable. The terminal device 7 may be charged by attaching the terminal device 7 to a cradle (not shown) having a charging function. That is, although not shown in the drawings, a cradle with which power can be obtained from an external power supply can be connected to the power supply IC 84 via the charging terminal 66, and the terminal device 7 can receive power supply from or be charged by an external power supply using the cradle.

The touch panel controller 71 is a circuit connected to the touch panel 52 for controlling the touch panel 52. The touch panel controller 71 generates touch position data of a predetermined format based on signals from the touch panel 52, and outputs it to the UI controller 75. The touch position data represents, for example, the coordinates of a position on the input surface of the touch panel 52 at which an input is made. The touch panel controller 71 reads a signal from the touch panel 52 and generates touch position data at a rate of once per a predetermined amount of time. Various control instructions for the touch panel 52 are outputted from the UI controller 75 to the touch panel controller 71.

The analog stick 53 outputs, to the UI controller 75, stick data representing the direction and the amount of slide (or tilt) of the stick portion operated with a finger of the user. The operation button 54 outputs, to the UI controller 75, operation button data representing the input status of each of the operation buttons 54A to 54L (e.g., whether it is pressed).

The magnetic sensor 72 detects the azimuthal direction by sensing the size and direction of the magnetic field. Azimuthal direction data representing the detected azimuthal direction is outputted to the UI controller 75. Control instructions for the magnetic sensor 72 are outputted from the UI controller 75 to the magnetic sensor 72. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 72 may be any sensor as long as it is possible to detect the azimuthal direction. Strictly speaking, in a place where there is a magnetic field other than the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 73 is provided inside the housing 50 for detecting the magnitude of the linear acceleration along each of the directions of the three axes (the x, y and z axes shown in FIG. 9(*a*)). Specifically, the acceleration sensor 73 detects the magnitude of the linear acceleration along each of the axes, where the x axis lies in the longitudinal direction of the housing 50, the y axis lies in the direction vertical to the surface of the housing 50, and the z axis lies in the width direction of the housing 50. Acceleration data representing the detected acceleration is outputted to the UI controller 75. Control instructions for the acceleration sensor 73 are outputted from the UI controller 75 to the acceleration sensor 73. While the acceleration sensor 73 is assumed to be a capacitive-type MEMS-type acceleration sensor, for example, in the present embodiment, other types of acceleration sensors may be employed in other embodiments. The acceleration sensor 73 may be an acceleration sensor for 1-axis or 2-axis detection.

The gyrosensor 74 is provided inside the housing 50 for detecting angular velocities about the three axes, i.e., the x-axis, the y-axis and the z-axis. Angular velocity data representing the detected angular velocities is outputted to the UI controller 75. Control instructions for a gyrosensor 74 are outputted from the UI controller 75 to the gyrosensor 74. The number and combination of gyrosensors used for detecting angular velocities about three axes may be any number and combination, and the gyrosensor 74 may be formed by a 2-axis gyrosensor and a 1-axis gyrosensor, as is the gyrosensor 48. The gyrosensor 74 may be a gyrosensor for 1-axis or 2-axis detection.

The UI controller 75 outputs, to the codec LSI 76, operation data including touch position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 76 is a circuit for performing a compression process on data to be transmitted to the game device 3, and an expansion process on data transmitted from the game device 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88. While the terminal device 7 does not itself perform game processes, the terminal device 7 may execute a minimal program for the management thereof and for the communication. When the terminal device 7 is started up, a program stored in the flash memory 83 is read out to the internal memory 88 and executed by the CPU 87 upon power-up. Some area of the internal memory 88 is used as the VRAM for the LCD 51.

The camera 56 captures an image in response to an instruction from the game device 3, and outputs the captured image data to the codec LSI 76. Control instructions for the camera 56, such as an image-capturing instruction, are outputted from the codec LSI 76 to the camera 56. Camera 56 can also record video. That is, the camera 56 can repeatedly capture images and repeatedly output the image data to the codec LSI 76.

The sound IC 78 is a circuit connected to the speaker 77 and the microphone 79 for controlling input/output of sound data to/from the speaker 77 and the microphone 79. That is, when sound data is received from the codec LSI 76, the sound IC 78 outputs sound signals obtained by performing D/A conversion on the sound data to the speaker 77 so that sound is outputted from the speaker 77. The microphone 79 detects sounds propagated to the terminal device 7 (the sound of the user, etc.), and outputs sound signals representing such sounds to the sound IC 78. The sound IC 78 performs A/D conversion on the sound signals from the microphone 79 to output sound data of a predetermined format to the codec LSI 76.

The codec LSI 76 transmits, as terminal operation data, image data from the camera 56, sound data from the microphone 79 and operation data from the UI controller 75 to the game device 3 via the wireless module 80. In the present embodiment, the codec LSI 76 performs a compression process similar to that of the codec LSI 27 on the image data and the sound data. The terminal operation data and the compressed image data and sound data are outputted, as transmit data, to the wireless module 80. The antenna 81 is connected to the wireless module 80, and the wireless module 80 transmits the transmit data to the game device 3 via the antenna 81. The wireless module 80 has a similar function to that of the terminal communication module 28 of the game device 3. That is, the wireless module 80 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The infrared communication module 82 establishes infrared communication in conformity with the IRDA standard, for example, with the other device. The codec LSI 76 may transmit, to the game device 3, data received via infrared communication while it is included in the transmit data as necessary.

As described above, compressed image data and sound data are transmitted from the game device 3 to the terminal device 7. These data are received by the codec LSI 76 via the antenna 81 and the wireless module 80. The codec LSI 76 expands the received image data and sound data. The expanded image data is outputted to the LCD 51, and images are displayed on the LCD 51. That is, the codec LSI 76 (the CPU 87) displays the received image data on the display section. The expanded sound data is outputted to the sound IC 78, and the sound IC 78 outputs sounds from the speaker 77.

In a case in which control data is included in data received from the game device 3, the codec LSI 76 and the UI controller 75 give control instructions to various sections in accordance with the control data. As described above, the control data is data representing control instructions for the components of the terminal device 7 (the camera 56, the touch panel controller 71, the marker section 55, sensors 62 to 64, and the infrared communication module 82 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker section 55, which is an infrared LED, the control can be done simply by turning ON/OFF the power supply thereto.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 72, the acceleration sensor 73 and the gyrosensor 74 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 79, it may not include the camera 56 and the microphone 79 or it may include only one of them in other embodiments.

While the terminal device 7 includes the marker section 55 as a configuration for calculating the positional relationship between the terminal device 7 and the controller 5 (the position and/or attitude, etc., of the terminal device 7 as seen from the controller 5), it may not include the marker section 55 in other embodiments. In other embodiments, the terminal device 7 may include other mechanisms as a configuration for calculating the positional relationship. For example, in other embodiments, the controller 5 may include a marker section, and the terminal device 7 may include an image-capturing element. Moreover, in such a case, the marker device 6 may include an image-capturing element, instead of an infrared LED.

[5. Outline of Game Processes]

Next, an outline of game processes to be performed in the game system 1 of the present embodiment will now be explained. The game performed by the game processes is a game of a type in which a plurality of players play against each other using a terminal device 7 and controllers 5 as controller devices. The present embodiment is directed to a case in which the game system 1 includes four controllers 5, and in which the four controllers 5 are used. That is, in the present embodiment, the game is played by a total of five players, including one player using the terminal device 7 and four players each using one of the four controllers 5. Hereinafter, each player using the controller 5 will be referred to as a "first player", and the control object of the first player as a "first object". The player using the terminal device 7 will be referred to as a "second player", and the control object of the second player as a "second object". In other embodiments, the number of controllers 5 is not limited to the above, and the game may be played by only one player who uses the terminal device 7.

Each player plays the game by controlling a control object of the player appearing in the game space. That is, the game device 3 obtains different sets of controller operation data representing operations performed on different controllers 5, and terminal operation data representing an operation performed on the terminal device 7. In the present embodiment, in addition to these operation data, the game device 3 obtains data of a captured image (camera image) captured by an image-capturing unit (the camera 56) of the terminal device 7. The game device 3 controls the action of each first object based on the controller operation data and controls the action of the second object based on the terminal operation data in the virtual game space. While the game to be played on the game system 1 may be any type of game, it is a hide-and-seek game in the present embodiment. Specifically, in the present game, the second player moves the second object so as to catch the first objects, and the first players move the first objects so as to run away from the second object.

Figure 13:
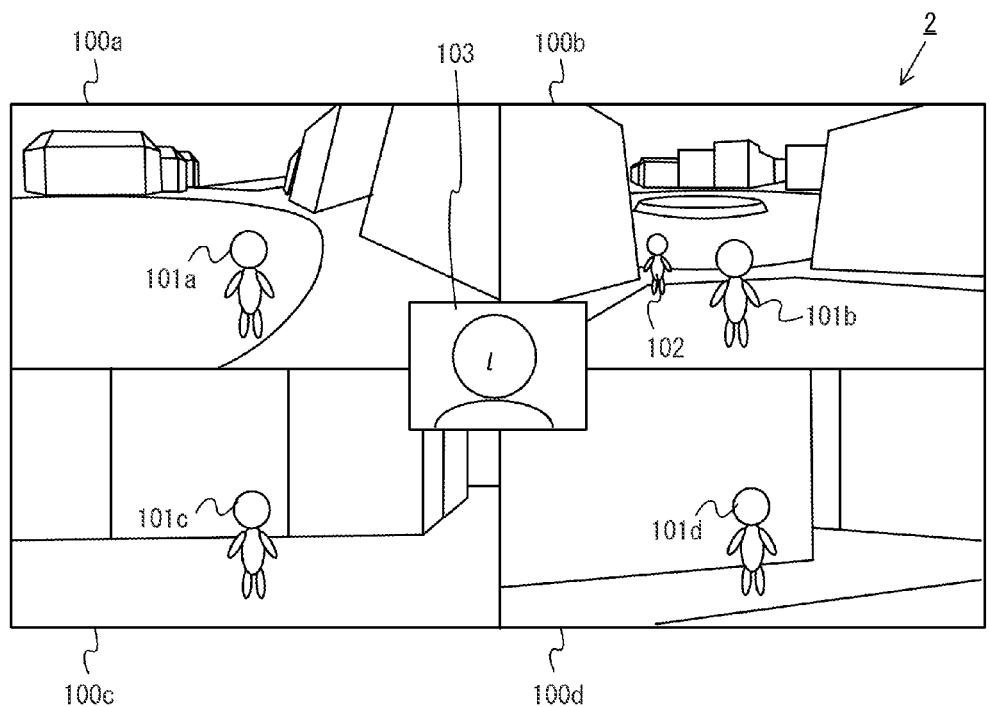
FIG. 13 is a diagram showing an example television image in the present embodiment.

FIG. 13 is a diagram showing an example television image in the present embodiment. The television image displayed on the television 2 is a game image for the first players. In the present embodiment, where there are four first players, four game images are generated for the first players, and the game images are displayed on the television 2. That is, as shown in FIG. 13, the screen area of the television 2 is divided into a number of areas equal to the number of controllers 5 (i.e., the number of the first players, which is herein four), and the game images are displayed in the divided areas 100a to 100d.

In the present embodiment, the game images corresponding to the first objects 101a to 101d are generated as game images for the first players. Specifically, in the present embodiment, game images including first objects 101 therein are generated, and more specifically, game images representing the game space as viewed from behind the first objects 101a to 101d are generated (see FIG. 13). In other embodiments, a game image representing the game space as viewed from the position of each first object 101 (a game image in first-person perspective) may be generated as the game image corresponding to the first object 101. Thus, in the present embodiment, the four areas 100a to 100d, which are obtained by dividing the screen area of the television 2, are associated respectively with the four first objects 101a to 101d, and the image of the game space including a first object 101 corresponding to one of the areas 100a to 100d is displayed in that area.

Moreover, in the present embodiment, a player image 103 is displayed on the television 2. The player image is a portion of the camera image that includes the face of the player. In the present embodiment, an image obtained by performing a predetermined process on the camera image is displayed as the player image, the details of which will be described later. In other embodiments, the camera image may be used as it is as the player image. In the present embodiment, the player image is an image representing (the face of) the second player who is using the terminal device 7. The player image may be displayed at any position on the screen of the television 2. Herein, it is displayed at the center of the screen (see FIG. 13).

In the game system 1, the player image may be displayed at any point in time while the game processes are performed. In FIG. 13, the player image 103 is displayed in real time during the game. Therefore, the players can enjoy watching, in real time, the facial expression of the second player during the game. In the present embodiment, when a predetermined game condition is satisfied, the game device 3 saves a player image generated based on a camera image that is obtained at the point in time when the game condition is satisfied, and then displays the player image on the television 2, the details of which will be described later. The game device 3 may display the player image after the game is ended, as well as during the game, e.g., when a level is passed, when the game is over, etc.

As described above, the game device 3 generates a television image including game images that represent the virtual space and correspond to the first objects 101, and at least a portion of the camera image (the player image). Then, the television image is outputted to the television 2 separate from the terminal device 7. Therefore, the players can enjoy watching, on the television 2, the facial expression of the second player while playing the game.

Figure 14:
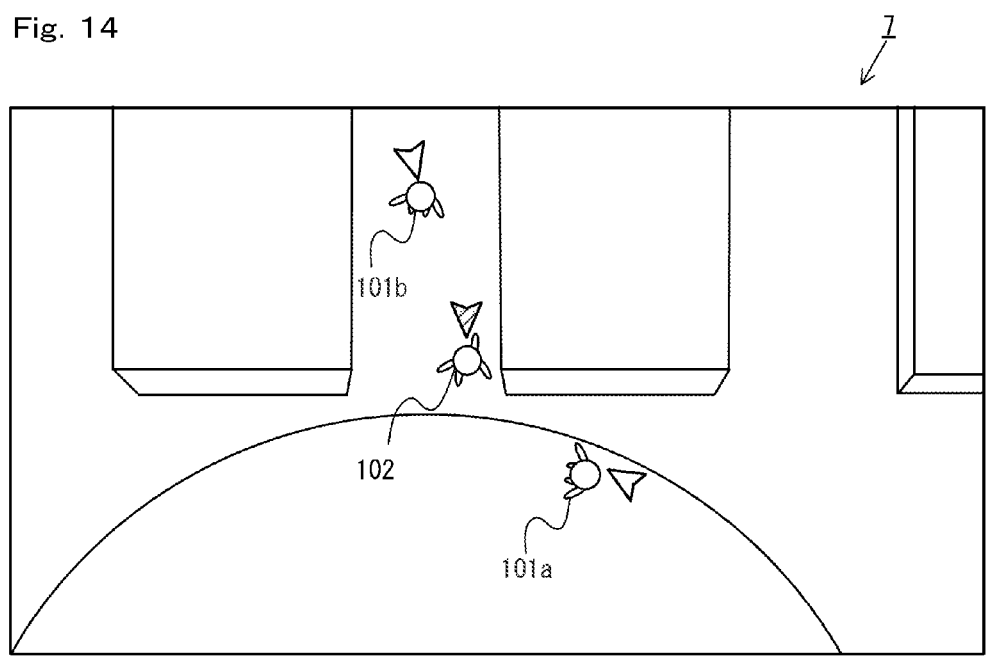
FIG. 14 is a diagram showing an example terminal image in the present embodiment.

FIG. 14 is a diagram showing an example terminal image in the present embodiment. The terminal image displayed on the terminal device 7 is a game image for the second player. The game device 3 generates a terminal image which is a game image that represents the virtual game space and corresponds to the second object, and outputs the terminal image to the terminal device 7. That is, as shown in FIG. 14, a game image including a second object 102 therein is displayed on the terminal device 7 as a game image corresponding to the second object 102. In the present embodiment, the game device 3 generates a game image representing the game space in which the second object 102 is viewed from above. In other embodiments, the game device 3 may generate a game image representing the game space in which the second object 102 is viewed from behind, or a game image of the game space as viewed from the position of the second object 102 (a game image in first-person perspective).

As described above, in the present embodiment, game images corresponding to the first objects 101 controlled by the first players and a player image representing the (the face of) the second player are displayed on the television 2. In the present embodiment, since the player image is displayed on the television 2, which every player can watch, players other than the second player (or people who are just watching the game) can enjoy watching the facial expression of the second player. Thus, it is possible to provide a game that is more entertaining. Moreover, the player image is not displayed on the terminal device 7, and the second player can therefore play the game without being distracted by the image of the face of the second player herself/himself. The player image blocks no area of the game image on the screen of the terminal device 7, and the player image can be presented without hindering the gameplay of the second player.

[6. Details of Game Processes]

Figure 15:
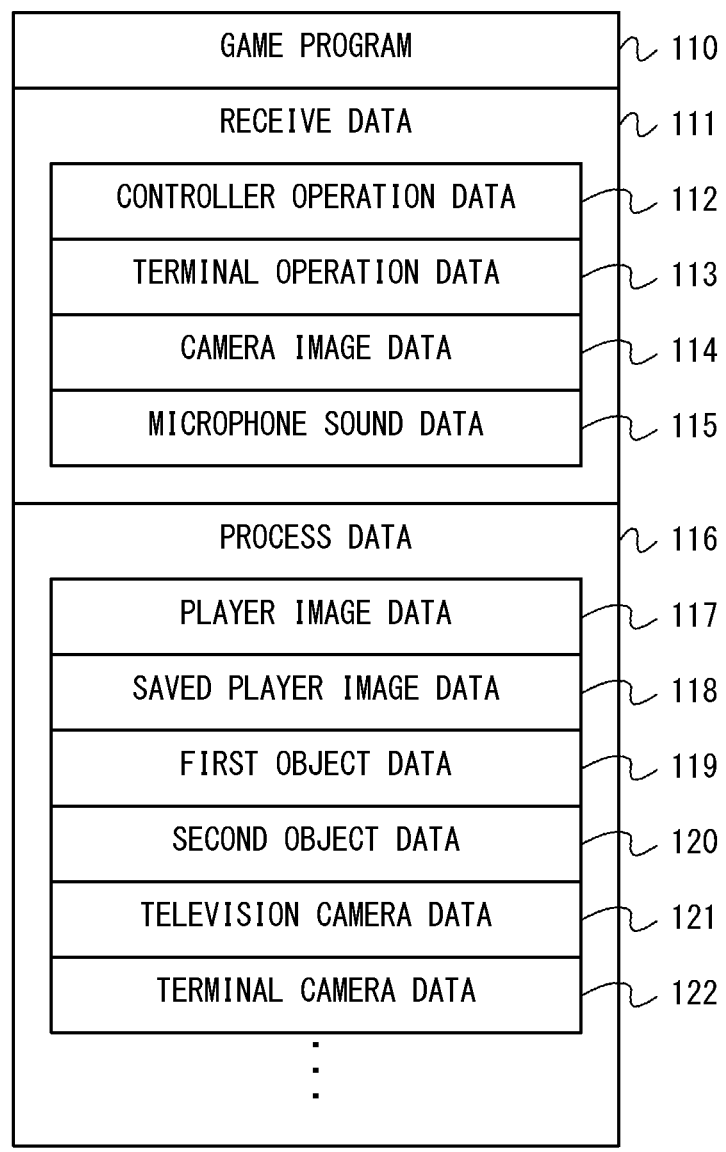
FIG. 15 is a diagram showing various data used in game processes.

Next, the details of game processes performed by the present game system will be described. FIG. 15 is a diagram showing various data used in the game processes. FIG. 15 shows primary data to be stored in the main memory (the external main memory 12 or the internal main memory 11*e*) of the game device 3. As shown in FIG. 15, the main memory of the game device 3 stores a game program 110, receive data 111, and process data 116. In addition to those shown in FIG. 15, the main memory also stores other data used in the game, such as image data of various objects appearing in the game, and sound data used in the game, etc. The storage unit for storing the various data shown in FIG. 15 may be any storage unit, and some of the various data may be stored in other embodiments in the flash memory 17, the VRAM 11*d*, or the like.

At an appropriate point in time after the power of the game device 3 is turned ON, a part or whole of the game program 110 is loaded from the optical disc 4 and stored in the main memory. The game program 110 may be obtained from the flash memory 17 or an external device of the game device 3 (e.g., via the Internet), instead of from the optical disc 4. A part of the game program 110 (e.g., a program for calculating the attitude of the controller 5 and/or the terminal device 7) may be pre-stored in the game device 3.

The receive data 111 are various data received (obtained) from the controller 5 and the terminal device 7. The receive data 111 includes controller operation data 112, terminal operation data 113, camera image data 114, and microphone sound data 115. If a plurality of controllers 5 are connected, the controller operation data 112 is stored for each of the controllers 5. If a plurality of terminal devices 7 are connected, the terminal operation data 113, the camera image data 114 and the microphone sound data 115 are stored for each of the terminal devices 7.

The controller operation data 112 is data representing an operation performed on the controller 5 by the user (first player), and is output (transmitted) from the controller 5 based on an operation performed on the controller 5. The controller operation data 112 is transmitted from the controller 5, and obtained by the game device 3 to be stored in the main memory. The game device 3 is capable of communicating with a plurality of controllers, and obtaining operation data from each of the controllers. Where there are a plurality of controllers, the controller operation data transmitted from the controllers are separately stored in the main memory. The main memory may store a predetermined number of latest (most recently obtained) sets of the controller operation data for each controller.

In the present embodiment, as data obtained from the main controller 8, the controller operation data 112 includes main operation button data, main acceleration data, angular velocity data, and marker coordinate data. The main operation button data is data representing the input state of each of the operation buttons 32*a* to 32*i* provided on the main controller 8. Specifically, the main operation button data represents whether each of the operation buttons 32*a* to 32*i* is being pressed. The main acceleration data is data representing the acceleration (acceleration vector) detected by the acceleration sensor 37 of the main controller 8. While the main acceleration data herein represents three-dimensional acceleration of which each component is the acceleration for one of the three axes of X, Y and Z shown in FIG. 3, it may represent acceleration for any one or more directions in other embodiments. The angular velocity data is data representing the angular velocity detected by the gyrosensor 48 of the main controller 8. While the angular velocity data represents angular velocity about each of the three axes of X, Y and Z shown in FIG. 3, it may represent angular velocity about anyone or more axes in other embodiments. The marker coordinate data is data representing coordinates calculated by the image processing circuit 41 of the image-capturing/processing unit 35, i.e., the marker coordinates. The marker coordinates are represented in a two-dimensional coordinate system for representing a position on a plane corresponding to the image captured by the image-capturing element 40, and the marker coordinate data represents the coordinate values in the two-dimensional coordinate system.

In the present embodiment, as data obtained from the sub-controller 9 (via the main controller 8), the controller operation data 112 includes sub-stick data, sub-operation button data, and sub-acceleration data. The sub-stick data is data representing an operation performed on the analog joy stick 91 of the sub-controller 9. Specifically, the sub-stick data represents the direction and the amount of tilt of the analog joy stick 91. The sub-operation button data is data representing the input state of each of the operation buttons provided on the sub-controller 9. Specifically, the sub-operation button data represents whether each of the operation buttons is being pressed. The sub-acceleration data is data representing the acceleration (acceleration vector) detected by the acceleration sensor 93 of the sub-controller 9. While the sub-acceleration data herein represents three-dimensional acceleration of which each component is the acceleration for one of the three axes of x', y' and z' shown in FIG. 7, it may represent acceleration for anyone or more directions in other embodiments.

As long as the controller operation data 112 represents the operation performed by the player on the controller 5, it may include only some of the various data included in the controller operation data 112 in the present embodiment. In a case in which the controller 5 includes another input unit (e.g., a touch panel, an analog stick, or the like), the controller operation data 112 may include data representing the operation performed on the other input unit. In a case in which the attitude of the controller itself is used as the game operation, the controller operation data 112 includes data whose value varies in accordance with the attitude of the controller 5 itself, such as the main acceleration data, the angular velocity data, the marker coordinate data or the sub-acceleration data.

The terminal operation data 113 is data representing an operation performed by a player on the terminal device 7. The terminal operation data 113 is transmitted from the terminal device 7 and obtained by the game device 3 to be stored in the main memory. The game device 3 is capable of communicating with a plurality of terminal devices, and obtaining operation data from each of the terminal devices. Where there are a plurality of terminal devices, the terminal operation data transmitted from the terminal devices are separately stored in the main memory. The main memory may store a predetermined number of latest (most recently obtained) sets of terminal operation data, for each terminal device.

The terminal operation data 113 includes angular velocity data, acceleration data, operation button data, stick data, touch position data, and azimuthal direction data. The angular velocity data is data representing the angular velocity detected by the gyrosensor 74. While the angular velocity data represents angular velocity about each of the three axes of x, y and z shown in FIG. 9 in the present embodiment, it may represent angular velocity about any one or more axes in other embodiments. The acceleration data is data representing the acceleration (acceleration vector) detected by the acceleration sensor 73. While the acceleration data represents three-dimensional acceleration of which each component is the acceleration for one of the three axes of x, y and z shown in FIG. 9, it may represent acceleration for any one or more directions in other embodiments. The gyrosensor 74 and the acceleration sensor 73 are example inertia sensors. The game device 3 can calculate the attitude of the terminal device 7 based on the detection results of the inertia sensors (the angular velocity data and the acceleration data).

The operation button data is data representing the input status of the operation buttons 54A to 54L provided on the terminal device 7. Specifically, the operation button data represents whether each of the operation buttons 54A to 54L is being pressed. The stick data is data representing the direction and the amount of slide (or tilt) of the stick portion of the analog stick 53 (the analog sticks 53A and 53B). The touch position data is data representing the position (touch position) on the input surface of the touch panel 52 at which an input is made. In a case in which the touch panel 52 is of a multi-touch type, the touch position data may represent a plurality of touch positions. The azimuthal direction data is data representing the azimuthal direction detected by the magnetic sensor 72. In the present embodiment, the azimuthal direction data represents the direction of a predetermined azimuthal direction (e.g., north) with respect to the terminal device 7. In a place where there is a magnetic field other than the geomagnetic field, the azimuthal direction data does not strictly represent the absolute azimuthal direction (e.g., north). Nevertheless, a relative direction of the terminal device 7 with respect to the direction of the magnetic field in that place is represented by the azimuthal direction data, and it is therefore possible to calculate, based on the azimuthal direction data, the attitude or the change in attitude of the terminal device 7 even in such cases.

The terminal operation data 113 may be data representing operations performed on the terminal device 7, and may be data including only one of the various data described above included in the terminal operation data 113 in the present embodiment. In a case in which the terminal device 7 includes other input units (e.g., a touch pad, an image-capturing unit of the controller 5, etc.), the terminal operation data 113 may include data representing operations performed on the other input units. In a case in which the movement of the terminal device 7 itself is used as a game operation as in the present embodiment, the terminal operation data 113 includes data regarding the movement of the terminal device 7 (data whose value changes in accordance with the movement), such as the acceleration data, the angular velocity data or the azimuthal direction data. The information regarding the movement of the terminal device 7 is information such as, for example, the position, the attitude, the change in position (velocity), the change in attitude (angular velocity), the acceleration, the angular acceleration, etc., of the terminal device 7.

The camera image data 114 is data representing the camera image captured by the camera 56 of the terminal device 7 (the captured image). The camera image data 114 is image data obtained by the codec LSI 27 expanding the compressed image data transmitted from the terminal device 7, and the data is stored in the main memory by the input/output processor 11a. The microphone sound data 115 is data representing sounds (microphone sounds) detected by the microphone 79 of the terminal device 7. The microphone sound data 115 is sound data obtained by the codec LSI 27 expanding the compressed sound data transmitted from the terminal device 7, and the data is stored in the main memory by the input/output processor 11a. The terminal device 7 may only output the terminal operation data and the camera image data, and may not output the microphone sound data.

Figure 16:
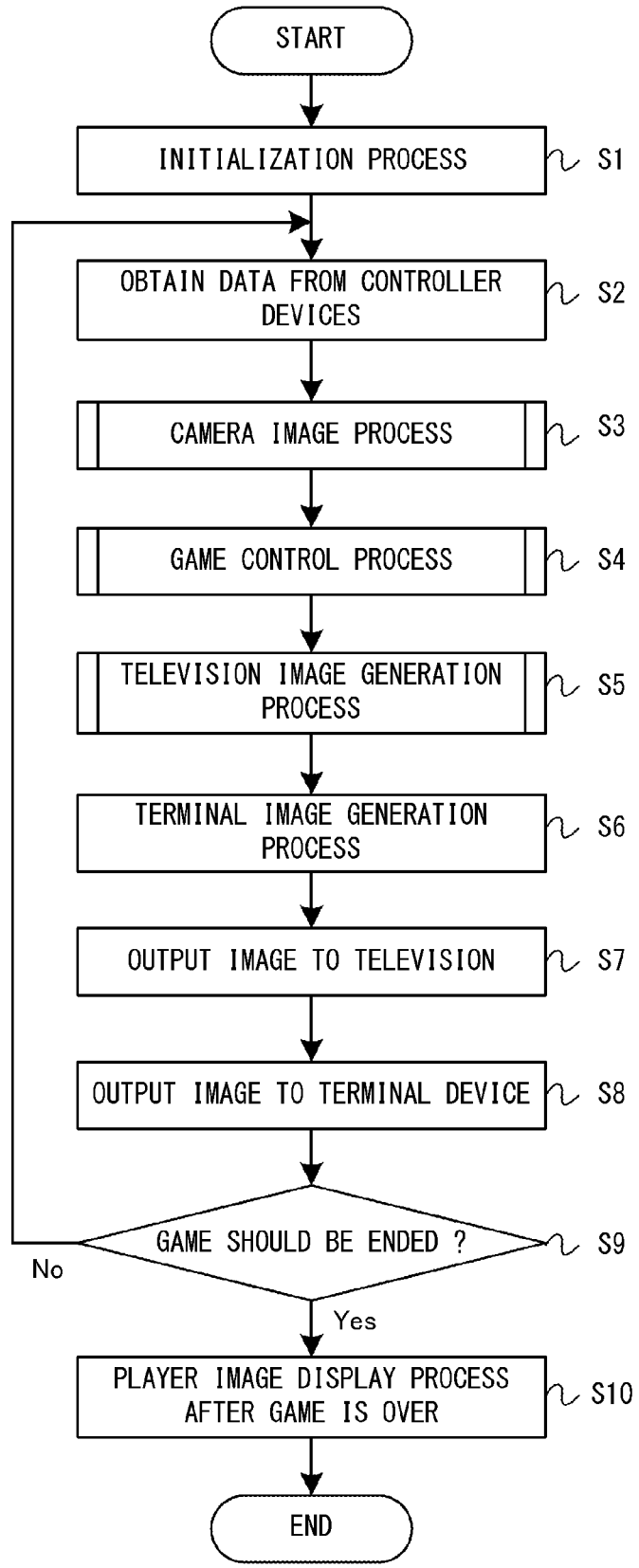
FIG. 16 is a main flow chart showing an example flow of game processes performed by the game device 3.

The process data 116 is data used in game processes to be described below (FIG. 16). The process data 116 includes player image data 117, saved player image data 118, first object data 119, second object data 120, television camera data 121, and terminal camera data 122. In addition to the data shown in FIG. 15, the process data 116 includes various data used in game processes such as data representing various parameters set for various objects appearing in the game.

The player image data 117 is data of the player image displayed on the television 2. As described above, the player image data 117 is generated based on the camera image data 114. In the present embodiment, the player image data 117 is updated each time a new player image is generated. The saved player image data 118 is a player image (referred to as a "saved player image") that is generated in response to a satisfaction of a predetermined game condition. That is, in the present embodiment, when a predetermined game condition is satisfied, the player image data 117 is stored in the main memory as the saved player image data 118. A plurality of kinds of the saved player image data 118 may be stored in the main memory. The player image data 117 and the saved player image data 118 may be stored in the VRAM 11*d*.

The first object data 119 represents the position and the direction of the first object 101 in the game space. In the present embodiment, since there are a plurality (four) of the first objects 101*a* to 101*d*, the first object data 119 is stored in the main memory for each first object. The second object data 120 represents the position and the direction of the second object in the game space.

The television camera data 121 represents the position and the attitude of the virtual camera (referred to as the "television camera") which is set in the game space for generating the television image. In the present embodiment, the same number of television cameras as the number of first objects are set so that the television cameras are associated with the first objects. In the present embodiment, since four television cameras are set, the television camera data 121 is stored in the main memory for each television camera. The terminal camera data 122 represents the position and the attitude of the virtual camera (referred to as the "terminal camera") which is set in the game space for generating the terminal image.

Next, the details of game processes performed by the game device 3 will be described with reference to FIGS. 16 to 20. FIG. 16 is a main flow chart showing the flow of game processes performed by the game device 3. When the power of the game device 3 is turned ON, the CPU 10 of the game device 3 executes a boot program stored in a boot ROM (not shown), so as to initialize each unit, including the main memory. Then, the game program stored in the optical disc 4 is loaded to the main memory, and the CPU 10 starts executing the game program. The flow chart shown in FIG. 16 is a flow chart showing the process to be performed after processes described above are completed. The game device 3 may be configured to execute the game program immediately after power-up, or it may be configured so that a built-in program is executed after power-up for displaying a predetermined menu screen first, and then the game program is executed in response to an instruction from the user to start the game.

The processes of the steps of the flow charts shown in FIGS. 16 to 20 are merely illustrative, and the order of steps to be performed may be switched around as long as similar results are obtained. The values of the variables, and the threshold values used in determination steps are also merely illustrative, and other values may be used as necessary. While the present embodiment is described assuming that the processes of the steps of the flow chart are performed by the CPU 10, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the game space at their initial positions, and setting initial values of various parameters used in the game processes. In the present embodiment, the objects 101 and 92 are each arranged at a predetermined position and in a predetermined direction. Data representing the positions and the directions of the first objects 101*a* to 101*d* is stored in the main memory as the first object data 119, and data representing the position and the direction of the second object 102 is stored in the main memory as the second object data 120. The virtual cameras (the television camera and the terminal camera) are set at initial positions and in initial attitudes in accordance with the positions and the directions of the objects 101 and 92. Data representing the initial positions and the initial attitudes of the television cameras are stored in the main memory as the television camera data 121, and data representing the initial position and the initial attitude of the terminal camera is stored in the main memory as the terminal camera data 122. The process of step S2 is performed, following step S1. Thereafter, the process loop including a series of processes of steps S2 to S9 is repeatedly performed at a rate of once per a predetermined amount of time (a one frame period, e.g., 1/60 sec).

In step S2, the CPU 10 obtains data transmitted from the controllers 5 and the terminal device 7. Since the controller 5 repeatedly transmits the controller operation data to the game device 3, the controller communication module 19 in the game device 3 successively receives the controller operation data, and the input/output processor 11*a* successively stores the received controller operation data in the main memory. Since the terminal device 7 repeatedly transmits the terminal operation data, the camera image data and the microphone sound data to the game device 3, the game device 3 successively receives these three data. In the game device 3, the terminal communication module 28 successively receives these data, and the camera image data and the microphone sound data are successively expanded by the codec LSI 27. Then, the input/output processor 11*a* stores the terminal operation data, the camera image data and the microphone sound data in the main memory. The receive data 111 (various data 112 to 115) stored in the main memory is read out by the CPU 10 at an appropriate point in time. The process of step S3 is performed, following step S2.

In step S3, the CPU 10 performs a camera image process. The camera image process is a process of generating a player image to be displayed on the television 2 based on the camera image. The details of the camera image process will now be described with reference to FIG. 17.

Figure 17:
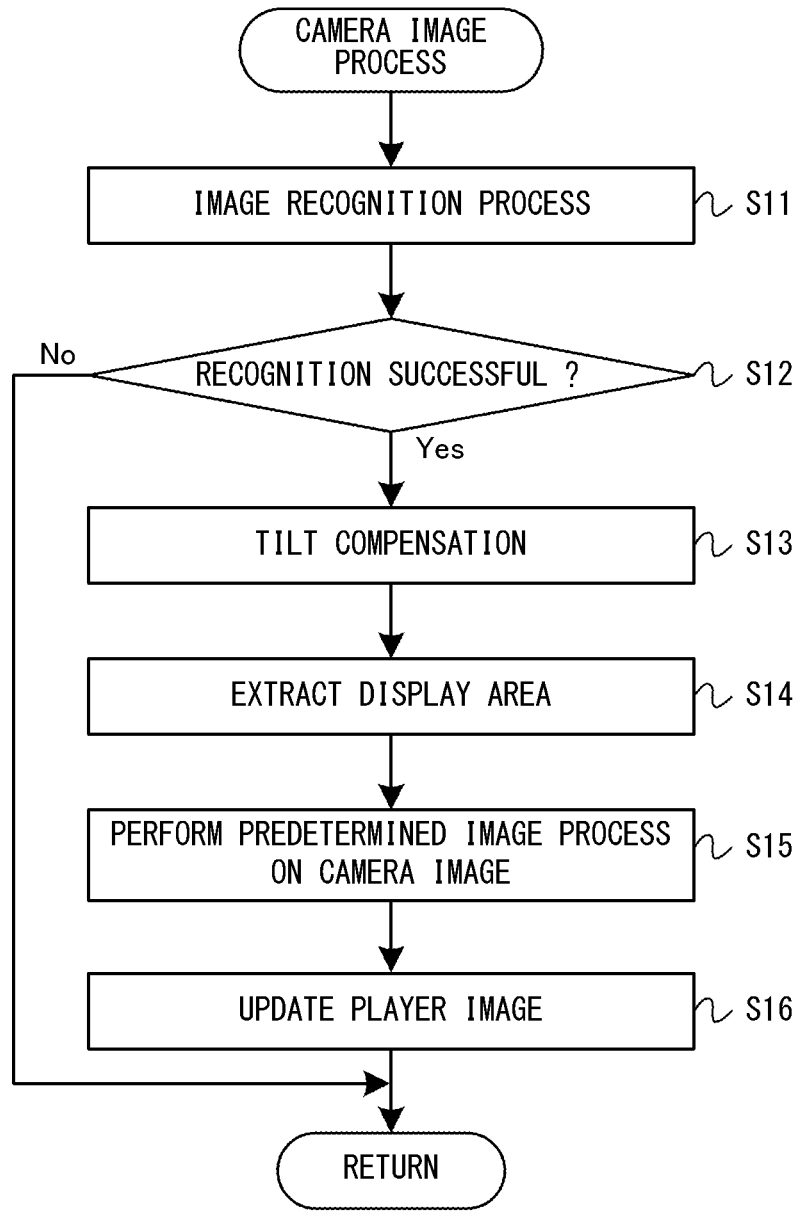
FIG. 17 is a flow chart showing an example detailed flow of a camera image process (step S3) shown in FIG. 16.

FIG. 17 is a flow chart showing a detailed flow of the camera image process (step S3) shown in FIG. 16. In the camera image process, first, in step S11, the CPU 10 performs the image recognition process on the camera image obtained in step S2. The image recognition process is a process of extracting some features from the camera image and calculating information regarding the extracted features. Specifically, any process may be employed for this image recognition process. In the present embodiment, the CPU 10 performs a recognition process of recognizing a face in the camera image. The specific method of the image recognition process may be similar to any of conventional recognition methods. The purpose of the image recognition process is to recognize the face of the second player, and for example if a plurality of faces are included in the camera image, the process may be a process of recognizing the largest one. As a specific process of step S11, the CPU 10 reads out the camera image data 114 from the main memory, and performs the recognition process. As a result of the recognition process, positions of face feature points (the eyes, the nose, the mouth, etc.) are calculated, for example, and the CPU 10 stores the data calculated as a result of the recognition process in the main memory. Where the image recognition process fails, e.g., where the face (the feature points) is not detected in the camera image, data indicating the failure is stored in the main memory. The process of step S12 is performed, following step S11.

In the present embodiment, the image recognition process of step S11 is performed within a one frame period, and the recognition process is supposed to be completed within the process loop of steps S2 to S9. Depending on the resolution of the camera image and the processing capacity of the CPU 10, etc., it may be difficult to complete one iteration of image recognition process within a one frame period. Therefore, in other embodiments, the image recognition process does not always need to be performed with the same cycle as the image generation/display process (steps S5 to S8), which is performed with a cycle of a one frame period. That is, only a portion of the entire image recognition process may be performed in one iteration of step S11. In such a case, the process to be performed in one iteration of step S11 is adjusted to such an amount of process that the series of processes of steps S2 to S9 can be completed within a one frame period. In other words, the image recognition process may be performed in parallel to, separately from, the process loop of steps S2 to S9, and it may be performed only when the CPU 10 is idling.

In step S12, the CPU 10 determines whether the image recognition process has succeeded. That is, the CPU 10 reads out data representing the results of the recognition process of step S11 from the main memory, and makes the determination based on the data. If the determination result of step S11 is affirmative, the process of step S12 is performed. On the other hand, if the determination result of step S11 is negative, the CPU 10 ends the camera image process. Then, in order to indicate that nothing has been recognized (that recognition has failed), a special image for the recognition failure may be displayed instead of a player image. The image for the recognition failure may be a snow noise image, for example.

In steps S13 and S14, the CPU 10 performs the process of modifying the camera image so as to obtain an appropriate image including the face of the second player. The player image may be any image generated based on the camera image, and the camera image may be used as it is as the player image, for example. Note however that if the camera image is used as it is as the player image, it may become difficult for a person to recognize the face of the second player in the player image. That is, depending on the positional relationship between the terminal device 7 and the second player, the face of the second player may not be present near the center of the camera image, or the second player may appear tilted (where the terminal device 7 is being held tilted). In steps S13 and S14, the CPU 10 processes the camera image so that the face of the second player is displayed in an easy-to-view manner by rotating the camera image or extracting a portion of the camera image. The details of the process of steps S13 and S14 will now be described.

In step S13, the CPU 10 compensates for a tilt of the camera image. In the present embodiment, the second player performs operations while holding the terminal device 7, and may perform operations of tilting the terminal device 7. Therefore, the terminal device 7 may be held tilted with respect to a direction perpendicular to the screen of the LCD 51 (the y-axis direction shown in FIG. 8). In such a case, the face of the second player will appear tilted in the camera image. Therefore, the CPU 10 performs a compensation process of rotating the camera image so that the face of the second player will appear upright. The amount (angle) and direction of the rotation of the camera image may be determined based on the results of the image recognition process described above, or may be determined based on the tilt of the terminal device 7 (the tilt with respect to the rotation in the y-axis direction) calculated (estimated) based on the terminal operation data. For example, where the positions of both eyes are obtained in the image recognition process, the CPU 10 may rotate the camera image so that the left and right eyes are aligned horizontally. The CPU 10 may calculate the tilt of the terminal device 7 based on at least one of the angular velocity data, the acceleration data and the azimuthal direction data, and rotate the camera image by the same amount as the amount of tilt of the terminal device 7 in the opposite direction to the tilt direction of the terminal device 7. Specifically, the CPU 10 reads out the camera image data 114 from the main memory, and performs the compensation process described above. Then, data of the compensated camera image is stored in the main memory (or the VRAM 11d). The process of step S14 is performed, following step S13.

In step S14, the CPU 10 extracts, from the camera image, a portion thereof to be displayed on the television 2 as the player image. The position and the size of the face of the second player in the camera image may differ depending on the positional relationship between the second player and the terminal device 7. Therefore, depending on how the terminal device 7 is being held by the second player, the face of the second player may not be located at the center of the camera image or the face of the player may appear smaller. Therefore, the CPU 10 extracts a portion from the camera image so that the face of the second player will appear in a predetermined size near the center of the image. While the portion to be extracted may be determined by any method, the CPU 10 may recognize the position and size of the face through the recognition process described above, and determine the portion to be extracted based on the recognized position and size of the face, for example. For example, the CPU 10 may extract a predetermined portion from the camera image. Specifically, the CPU 10 reads out data stored in step S13 from the main memory, and extracts a portion to be used as the player image. Then, the image data of the extracted portion is stored in the main memory (or the VRAM 11d). The process of step S15 is performed, following step S14.

In step S15, the CPU 10 performs a predetermined image process on the image of the portion extracted in step S14. While this image process may be any process, it is herein a process of superimposing a predetermined image on the face of the player, or a process of adding changes to the face of the player, for example. That is, the CPU 10 may superimpose a predetermined image on a portion of the camera image including the face recognized by the image recognition process described above. The predetermined image may be any image, e.g., an image representing a character appearing in the game (the second object, etc.). Specifically, the CPU 10 may superimpose, on the extracted image, an image of a cap, or a mustache, that is also worn by the character. The CPU 10 may add predetermined changes to a portion of the camera image including the face recognized by the image recognition process described above. For example, a portion of the face (the eyes, the nose or the mouth) may be enlarged, or the hue of the face may be changed. The player may be allowed to specify the particulars of the image process. As a specific process of step S15, the CPU 10 reads out the image data stored in step S14 and performs the image process described above. Then, the processed image data is stored in the main memory (or the VRAM 11d). The process of step S16 is performed, following step S15.

In the present embodiment, the CPU 10 performs a predetermined image process on a portion of the camera image including the face recognized by the recognition process described above, as in step S15 described above. Then, a first game image including the processed image is generated. Therefore, in the present embodiment, it is possible to add an image in accordance with the contents of the game, or a special game-related effect, to the face of the second player displayed on the television 2, and it is possible to display the face in such a manner the face looks better.

In step S17, the CPU 10 updates the player image. Specifically, the image data stored in step S15 described above is read out from the main memory, and is stored in the main memory as new player image data 117. After step S17, the CPU 10 ends the camera image process.

In the camera image process described above, the player image is generated by performing the processes of steps S13 to S15 on the obtained camera image. In other embodiments, some or all of these processes may be skipped, and the camera image may be used as it is as the player image.

In the camera image process described above, one iteration of the image recognition process (step S11) is completed within one iteration of the process loop of steps S2 to S9. However, one iteration of the image recognition process does not have to be completed within one iteration of the process loop. That is, the CPU 10 may successively obtain data of the camera image (step S2) and update the player image (step S16) with a frequency that is less than that with which the data of the camera image is obtained. That is, of the images to be displayed on the television 2, the update frequency of the player image may be less than that of the image representing the game space. Then, it is possible to reduce the process load on the CPU 10 from the image recognition process.

Referring back to FIG. 16, in step S4 following step S3, the CPU 10 performs the game control process. The game control process is a process of allowing the game to progress by performing, for example, a process of moving objects in the game space in response to game operations by the players. Specifically, in the game control process of the present embodiment, the process of controlling the movement of the objects 101 and 92, the process of controlling the virtual cameras, etc., are performed. The details of the game control process will now be described with reference to FIG. 18.

Figure 18:
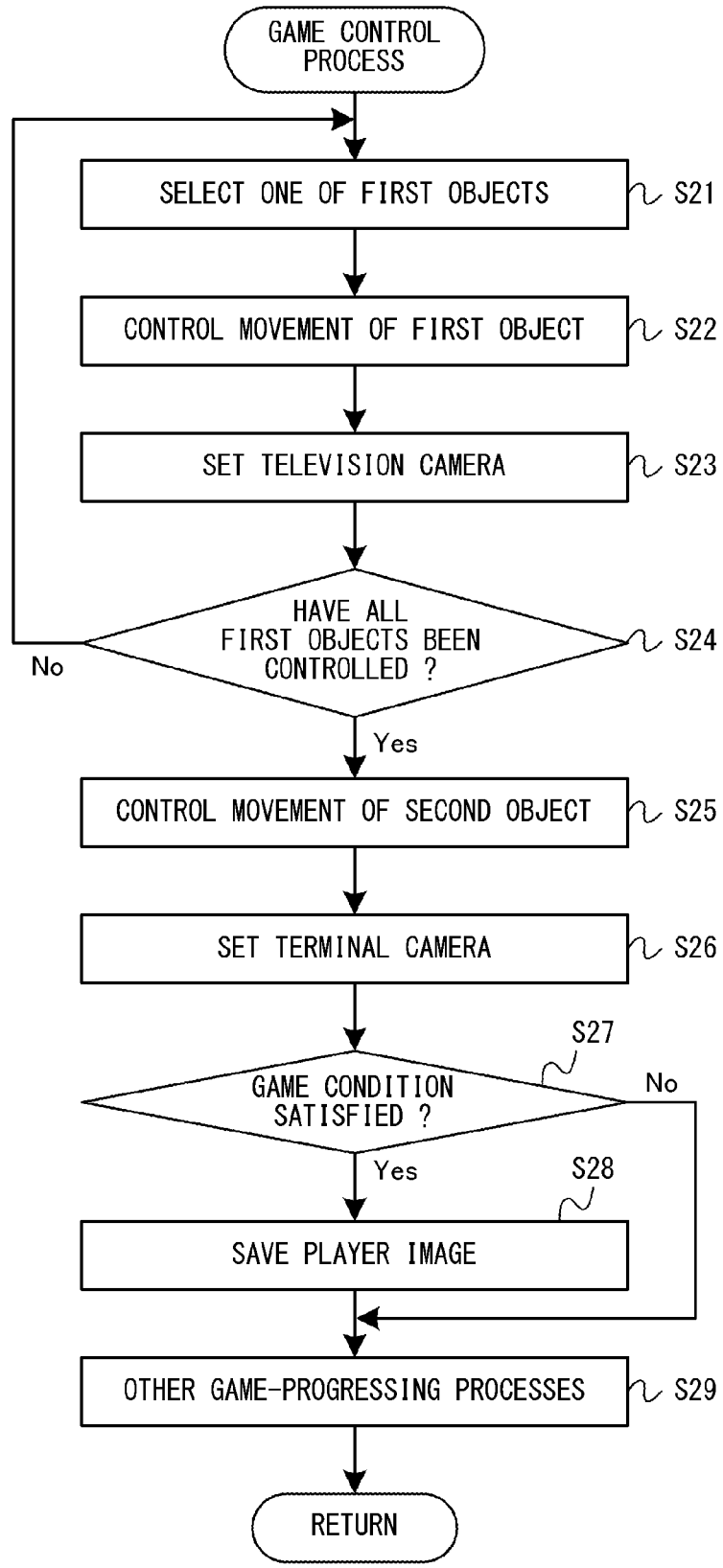
FIG. 18 is a flow chart showing an example detailed flow of a game control process (step S4) shown in FIG. 16.

FIG. 18 is a flow chart showing a detailed flow of the game control process (step S4) shown in FIG. 16. In the game control process, first, in step S21, the CPU 10 selects one of the first objects 101. The first object 101 to be selected here is one of the first objects 101 that have not been selected in the process loop of steps S21 to S24. The process of step S22 is performed, following step S21.

In step S22, the CPU 10 controls the movement of the first object 101 selected in step S21. The movement of the first object 101 may be controlled in any manner as long as it is controlled based on the controller operation data 112. In the present embodiment, the CPU 10 calculates the position of the first object 101 after the movement in accordance with a direction input on the analog stick 91 of the sub-controller 9, for example. That is, the first object 101 is moved in a direction in accordance with the operation direction (tilt direction) by an amount of movement in accordance with the amount of operation (amount of tilt) of the analog stick 91. As a specific process of step S22, the CPU 10 reads out the first object data 119 representing the position and the direction of the first object 101 before the movement and the controller operation data 112 from the main memory. Then, the position and the direction after the movement are calculated based on the position and the direction before the movement and the sub-stick data. The data representing the calculated position and direction after the movement is stored in the main memory as new first object data 119. As described above, the CPU 10 performs a control so as to move the first object 101 arranged in the virtual space as the control object, based on the controller operation data. Since the process of step S22 described above is repeated a number of times equal to the number of first objects in the present embodiment, the CPU 10 controls the action of each of the plurality of control objects (first objects) based on the corresponding controller operation data. The process of step S23 is performed, following step S22.

In step S23, the CPU 10 sets a television camera corresponding to the first object 101 in the game space. This first object 101 is the first object 101 whose movement has been controlled in step S22. While the method for controlling the television camera may be any method herein, the television camera may be controlled so as to move in accordance with the movement of the first object 101. In the present embodiment, the CPU 10 sets a television camera so that the first object 101 is included in the viewing field range of the television camera. That is, a television camera is set so that the corresponding first object 101 is included in the game image to be generated by the television camera. Specifically, the television camera is set at a predetermined position that is behind and slightly above the first object 101 and in an attitude such that the television camera faces toward the first object 101 (see FIG. 13). In other embodiments, the television camera may be set at the position of the first object 101. Then, the game image will be a game image in so-called "first-person perspective". As a specific process of step S23, the CPU 10 reads out the first object data 119 from the main memory, and calculates the position and the direction of the television camera based on the first object data 119. Data representing the calculated position and direction is stored in the main memory as the television camera data 121. The process of step S24 is performed, following step S23.

In step S24, the CPU 10 determines whether the movement control process has been completed for all the first objects 101, i.e., whether all the first objects 101 have been selected in step S21 described above. If the determination result of step S24 is affirmative, the process of step S25 is performed. If the determination result of step S24 is negative, the process of step S21 is performed again. Thus, the processes of steps S21 to S24 described above are performed for each of the first objects 101, thereby moving each of the first objects 101.

In step S25, the CPU 10 performs a control so as to move the second object 102 arranged in the game space as the control object, based on the terminal operation data 113. The movement of the second object 102 may be controlled in any manner as long as it is controlled based on the terminal operation data 113. In the present embodiment, the CPU 10 calculates the position of the second object 102 after the movement in accordance with a direction input on the left analog stick 53A of the terminal device 7, for example. That is, the second object 102 is moved in a direction in accordance with the operation direction by an amount of movement in accordance with the amount of operation of the left analog stick 53A. As a specific process of step S25, the CPU 10 reads out the second object data 120 representing the position and the direction of the second object 102 before the movement and the terminal operation data 113 from the main memory.

Then, the position and the direction after the movement are calculated based on the position and the direction before the movement and the stick data included in the terminal operation data 113. The data representing the calculated position and direction after the movement is stored in the main memory as new second object data 120. The process of step S26 is performed, following step S25.

In step S26, the CPU 10 sets a terminal camera corresponding to the second object 102 in the game space. While the method for controlling the terminal camera may be any method herein, the terminal camera may be controlled so as to move in accordance with the movement of the second object 102. In the present embodiment, the CPU 10 sets the terminal camera so that the second object 102 is included in the viewing field range of the terminal camera. That is, the terminal camera is set so that the second object 102 is included in the game image to be generated by the terminal camera. Specifically, the terminal camera is set at a position that is above the second object 102 (see FIG. 14). In other embodiments, the terminal camera may be set at a position that is behind the second object 102, as is the television camera. The terminal camera may be set at the position of the second object 102. Then, the game image will be a game image in so-called "first-person perspective". As a specific process of step S26, the CPU 10 reads out the second object data 120 from the main memory, and calculates the position and the direction of the terminal camera based on the second object data 120. Then, data representing the calculated position and direction is stored in the main memory as the terminal camera data 122. The process of step S27 is performed, following step S26.

In step S27, the CPU 10 determines whether a predetermined game condition has been satisfied. The predetermined game condition may be any game condition as long as it is related to the game. In the present embodiment, the CPU 10 uses, as the predetermined condition, a condition that any of the first objects 101a to 101d has been caught by the second object 102. In other embodiments, the predetermined condition may be any condition such as, for example, the control object obtaining a particular item, the player passing a level, the player setting a new high score, the game being over, etc. The predetermined game condition may also be for example a condition that any of the players performing a predetermined operation. In the present embodiment, the CPU 10 reads out the object data 119 and 120 from the main memory, and determines whether any of the first objects 101a to 101d has been caught by the second object 102 based on the positional relationship between the positions of the first objects 101a to 101d and the position of the second object 102. If the determination result of step S27 is affirmative, the process of step S28 is performed. On the other hand, if the determination result of step S27 is negative, the CPU 10 performs the process of step S29 again, skipping the process of step S28.

For any first object 101 that is determined to have been caught in step S27 described above, a player image is displayed on an area of the screen (of the television 2) corresponding to the first object (see FIG. 20), the details of which will be described later. The player image displayed here is the player image, or the saved player image, at the point in time when the first object was caught. That is, the determination process of step S27 is a process of determining whether or not to display the saved player image.

In step S28, the CPU 10 saves the player image. That is, the CPU 10 reads out the player image data 117 from the main memory, and stores the player image data 117 in the main memory as the saved player image data 118. Thus, it is possible to save the player image which has been generated in response to a satisfaction of a predetermined condition. The "player image which has been generated in response to a satisfaction of a predetermined condition" may be a player image that is generated at the point in time when the predetermined condition is satisfied, or a player image that is generated based on a camera image obtained at the point in time when the predetermined condition is satisfied. That is, in other embodiments, if one iteration of the image recognition process is not completed within one iteration of the process loop described above, the CPU 10 may save a player image that is generated after step S28 based on the latest camera image obtained at the time of step S28. The process of step S29 is performed, following step S28.

In step S29, the CPU 10 performs other game-progressing processes. Other game-progressing processes are those performed in the game control process of step S4, other than the processes of steps S21 to S28 described above. The above and other game-progressing processes include, for example, processes of controlling the action of objects other than those objects controlled by the player, processes related to items arranged in the game space, etc. Other than the processes described above, a process for allowing the game to progress is performed as necessary in step S29. After step S29, the CPU 10 ends the game control process.

Referring back to FIG. 16, the process of step S5 is performed, following the game control process of step S4. In step S5, the television image generation process is performed. In the television image generation process, a game image is generated which includes game images corresponding to the first objects 101a to 101d and the player image. The details of the television image generation process will now be described with reference to FIG. 19.

Figure 19:
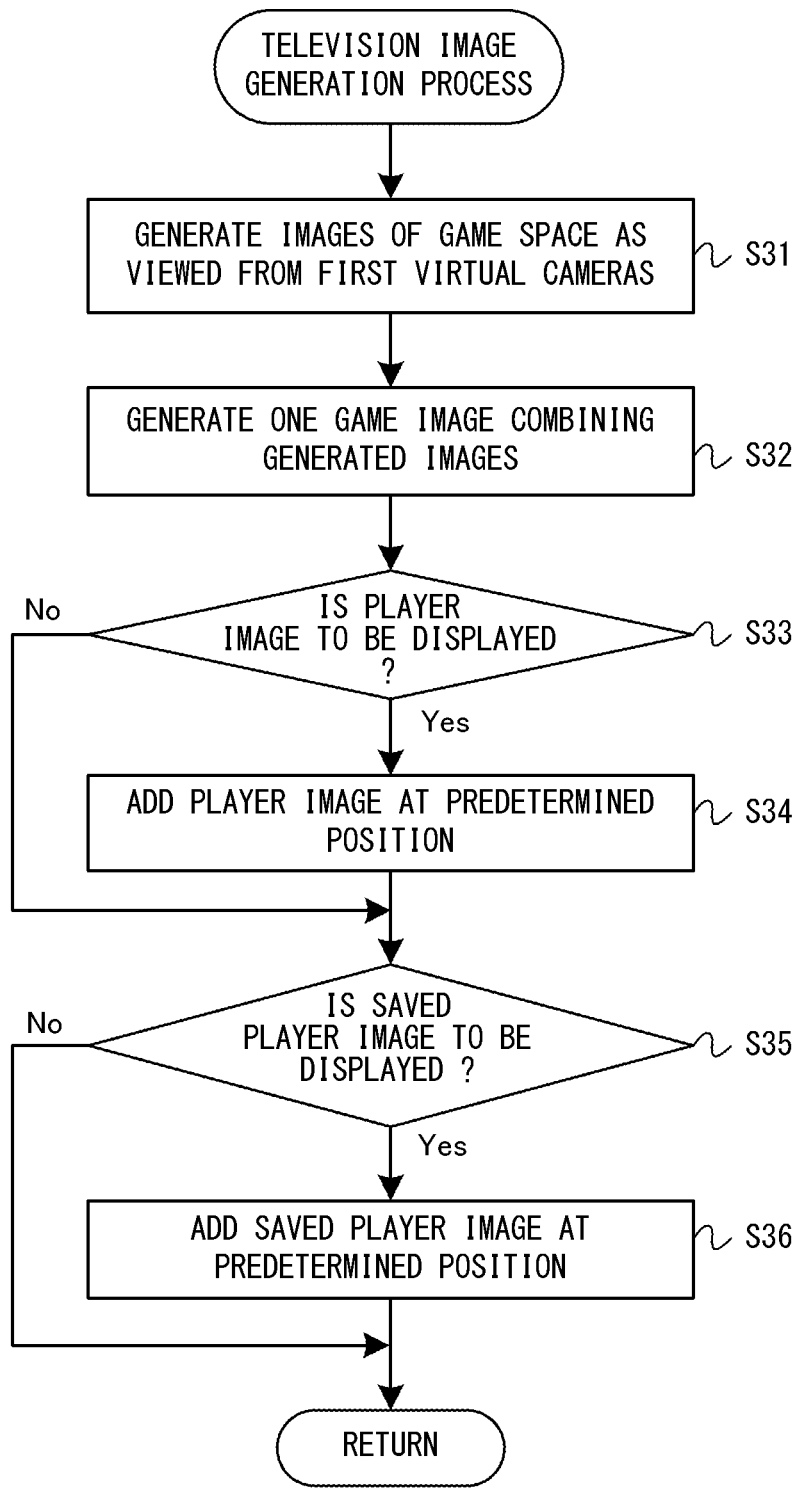
FIG. 19 is a flow chart showing an example detailed flow of a television image generation process (step S5) shown in FIG. 16.

FIG. 19 is a flow chart showing a detailed flow of the television image generation process (step S5) shown in FIG. 16. In the television image generation process, first, in step S31, the CPU 10 and the GPU 11b generate game images corresponding to the first objects. That is, the CPU 10 and the GPU 11b generate game images representing the game space as viewed from the television cameras. Specifically, the CPU 10 and the GPU 11b read out data representing the results of the game control process of step S4 from the main memory, and reads out data used for generating the game images from the VRAM 11d, to generate the game images. The "data representing the results of the game control process" includes the object data 119 and 120 and the television camera data 121. The game images generated as described above are stored in the VRAM 11d. The process of step S32 is performed, following step S31.

In step S32, the CPU 10 and the GPU 11b generate an image by combining together the game images generated in step S31. Specifically, data of four game images generated is read out from the VRAM 11d, and a game image is generated by combining together the four game images (see FIG. 13). The generated game image is stored in the VRAM 11d, and is displayed as the television image in the process of step S7 to be described later. Thus, in the present embodiment, the screen area of the television 2 is divided into a plurality of areas, and a plurality of images representing the game space as viewed from a plurality of television cameras are arranged in the different areas of the screen area. In the present embodiment, the screen area of the television 2 is divided in two vertically and in two horizontally, i.e., into four areas, and the television game image is generated so that four game images correspond respectively to the four areas. The screen may be divided in any manner in other embodiments, and it may be divided into four areas arranged vertically or horizontally. The number of areas into which the screen area is divided may be changed in accordance with the number of first players. The process of step S33 is performed, following step S32.

In step S33, the CPU 10 determines whether the player image is to be displayed. The process of step S33 is a process for determining whether the player image generated in real time from the camera image is to be displayed. Specifically, the CPU 10 determines whether image recognition process (step S11) has failed to recognize the face of the second player, i.e., whether the recognition process has failed. The determination process of step S33 can be performed by a method similar to step S12 described above. If the determination result of step S33 is affirmative, the process of step S34 is performed. On the other hand, if the determination result of step S33 is negative, the process of step S35 is performed, skipping the process of step S34.

In step S34, the CPU 10 and the GPU 11b add the player image to the game image for the first object 101 (the game image generated in step S32). That is, the CPU 10 and the GPU 11b read out the image data stored in step S32 and the player image data 117, and add the player image at a predetermined position on the game image. Data of the game image to which the player image has been added is stored in the VRAM 11b. The predetermined position may be any position, and is a position at the center of the game image (see FIG. 13) in the present embodiment. As described above, the game device 3 generates a television image including a plurality of game images corresponding respectively to a plurality of first objects 101a to 101d and at least a portion of the camera image (the player image). The process of step S35 is performed, following step S34.

As described above, in the present embodiment, the image of the face of the second player is obtained in real time and displayed on the television 2 during the game. That is, the CPU 10 performs the image recognition process (step S11) in response to the obtainment of the camera image in step S2, and generates the television image including the image of the recognized face (player image) in response to the recognition of the face by the image recognition process. Then, the television image is output to the television 2 (step S7) in response to the generation of the television image, as will be described later. Therefore, players can enjoy watching, in real time, the facial expression of the second player during gameplay. In the present embodiment, the facial expression of the second player operating the terminal device 7 is displayed on the television 2 which is different from the terminal device 7, and is not displayed on the terminal device 7. Therefore, a larger game space image can be displayed on the terminal image, thus presenting a game image that is easy to view for the second player.

In the present embodiment, the player image is not added to the television image in step S34 when the image recognition process fails to recognize a face, e.g., when the face of the second player is not included in the camera image. That is, when the camera 56 of the terminal device 7 has not appropriately captured the image of the face of the second player, the camera image obtained by the camera 56 is not displayed. Therefore, in the present embodiment, it is possible to prevent a camera image that does not include the face of the second player from being displayed on the television 2, and to prevent the television image from becoming less easy to view because of the addition of a meaningless image.

In step S35, the CPU 10 determines whether the saved player image is to be displayed. This determination can be made based on whether the player image has been saved in the process of step S28 described above. If the determination result of step S35 is affirmative, the process of step S36 is performed. On the other hand, if the determination result of step S35 is negative, the process of step S37 is performed, skipping the process of step S36.

In step S36, the CPU 10 adds the saved player image to the game image for the first object 101 (the game image generated in step S32 or S34). That is, the CPU 10 and the GPU 11b read out the image data stored in step S34 (step S32 in a case in which the process of step S34 has not been performed), and the saved player image data 118, and add the saved player image at a predetermined position on the game image. Data of the game image to which the saved player image has been added is stored in the VRAM 11b.

Figure 20:
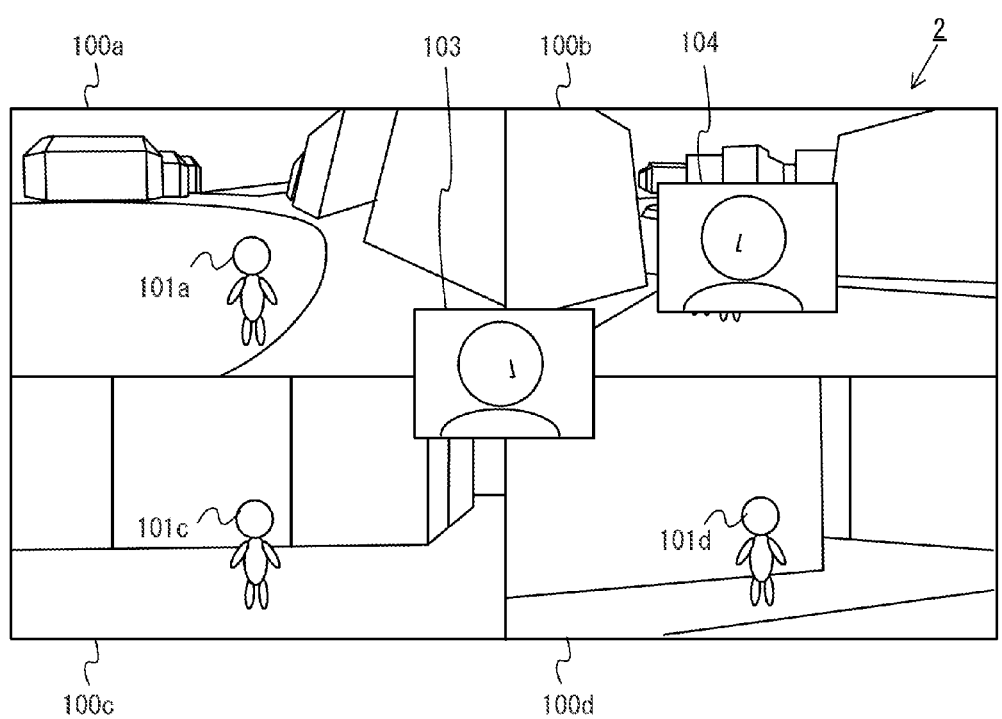
FIG. 20 is a diagram showing an example television image including a saved player image in the present embodiment.

The predetermined position may be any position. In the present embodiment, the CPU 10 determines whether a predetermined game condition has been satisfied for each of the first objects 101a to 101d in step S27. In step S36, the CPU 10 generates the television image by superimposing the saved player image on each game image corresponding to a first object for which the predetermined game condition is satisfied. In the present embodiment, "a first object for which the predetermined game condition is satisfied" is a first object that has been caught by the second object. FIG. 20 is a diagram showing an example television image including a saved player image in the present embodiment. As shown in FIG. 20, in the present embodiment, the saved player image 104 for the first object 101b is displayed in the area 100b for the game image of the first object 101b. Thus, in the present embodiment, the saved player image is located within the area for the game image including a first object that corresponds to the saved player image, among the areas 100a to 100d for the game images corresponding to the first objects 101a to 101d. That is, a player image that is saved in step S28 after a predetermined game condition is satisfied for a first object (i.e., has been caught by the second object) in step S27 is located within the area of the game image for that first object. Then, each player can easily know for which first objects 101 the predetermined game condition has been satisfied. After step S36, the CPU 10 ends the television image generation process.

With step S36 described above, each time a predetermined game condition is satisfied for one of the first objects 101a to 101d (i.e., each time one of the first objects 101a to 101d is caught by the second object), a player image captured at the point in time when the predetermined game condition is satisfied is displayed on the television 2. Therefore, if the predetermined game condition is satisfied at different points in time for the first objects 101a to 101d, a different player image will be displayed on the television 2 at each of the different points in time. Then, the players can enjoy watching different facial expressions of the second player for different points in time.

With the television image generation process described above, the CPU 10 generates the television image so that the television image includes a portion of the camera image that includes the face (the face of the second player) recognized by the image recognition process. Thus, the game system 1 can display the facial expression of the second player during gameplay on the television 2, and the players can enjoy watching the facial expression of the second player.

In the present embodiment, the CPU 10 stores a camera image captured at a predetermined point in time (a point in time when the determination result of step S27 is affirmative) in a predetermined storage unit (the main memory or the VRAM 11b) (step S28). Then, the CPU 10 generates a television image including at least a portion of the camera image stored in the storage unit (saved player image) (step S36). Thus, the game system 1 can store an image of the facial expression of the second player at a point in time when a certain event occurs in the game, and display the image on the television 2. For example, it is possible to display, on the television 2, the facial expression of the second player at a point in time when the second player sets a new high score, the facial expression of the second player at a point in time when the game is over, etc.

Referring back to FIG. 16, in step S6, the terminal image is generated based on the game control process described above. That is, the CPU 10 and the GPU 11b read out data representing the results of the game control process of step S3 from the main memory, and also read out data used for generating a game image from the VRAM 11d, to generate a terminal image. In the present embodiment, the CPU 10 and the GPU 11b generate a game image representing the game space as viewed from the terminal camera. Specifically, a terminal image representing the game space including the second object 102 as viewed from above is generated (see FIG. 15). The generated terminal image is stored in the VRAM 11d. The process of step S7 is performed, following step S6.

In step S7, the CPU 10 outputs the game image to the television 2. Specifically, the CPU 10 sends data of the television image stored in the VRAM 11d to the AV-IC 15. In response to this, the AV-IC 15 outputs the data of the television image to the television 2 via the AV connector 16. Thus, the television image is displayed on the television 2. In step S7, game sound data may also be outputted to the television 2, together with the game image data, so as to output the game sound from the speaker 2a of the television 2. The process of step S8 is performed, following step S7.

In step S8, the CPU 10 transmits the game image to the terminal device 7. Specifically, the image data of the terminal image stored in the VRAM 11d is sent to the codec LSI 27 by the CPU 10, and is subjected to a predetermined compression process by the codec LSI 27. Moreover, the compressed image data is transmitted by the terminal communication module 28 to the terminal device 7 via the antenna 29. The terminal device 7 receives, by means of the wireless module 80, the image data transmitted from the game device 3, and a predetermined expansion process is performed by the codec LSI 76 on the received image data. The expanded image data is outputted to the LCD 51. Thus, the terminal image is displayed on the LCD 51. In step S8, the game sound data may also be transmitted to the terminal device 7, together with the game image data, so as to output the game sound from the speaker 77 of the terminal device 7. If control data described above is generated in the game device 3, the control data may be transmitted to the terminal device 7, in addition to the image data, in step S8. The process of step S9 is performed, following step S8.

In step S9, the CPU 10 determines whether the game should be ended. The determination of step S9 is made based on, for example, whether the game is over, whether a player has given an instruction to quit the game, etc. If the determination result of step S9 is negative, the process of step S2 is performed again. Thereafter, the series of processes of steps S2 to S9 is repeatedly performed until it is determined in step S9 that the game should be ended. On the other hand, if the determination result of step S9 is affirmative, the process of step S10 is performed. In such a case, the game has been ended, and the process of step S10 is a process after the game is ended.

In step S10, the CPU 10 performs a process of displaying player images after the game is ended. This display process is a process of displaying, on the television 2, player images generated based on camera images obtained during the game (before the game is ended). Player images displayed in step S10 may be any images as long as the images are based on camera images obtained at predetermined points in time during the game. The predetermined point in time is, for example, a point in time when the control object obtains a particular item, a point in time when a level is passed, a point in time when a new high score is set, a point in time when the game is over, etc. Specifically, the CPU 10 may determine whether such predetermined points in time have come in the process of step S27 so as to save player images in the process of step S28, and later display the saved player images. That is, the CPU 10 reads out the saved player image data 118 from the main memory, and displays the saved player images on the television 2.

In step S10, information regarding the game may be displayed, together with the saved player image, on the television 2. For example, when a player image corresponding to a point in time when a new high score is set, the game device 3 may display the new high score, together with the player image, on the television 2. When a saved player image corresponding to a point in time when a first object is caught, the game device 3 may display the elapsed time from the start of the game until the first object is caught, together with the player image, on the television 2. After step S10, the CPU 10 ends the game process shown in FIG. 16.

With the game process described above, the image of the face of the second player during the game using the terminal device 7 is displayed on the television 2. Therefore, it is possible to present the image of the face of the second player in an easy-to-view manner not only to the second player who uses the terminal device 7 but also to other people such as the first players. In the present embodiment, people other than the second player can also enjoy watching, on the television 2, the facial expression of the second player while playing the game.

[7. Variations]

The embodiment above is merely an example, and the game system, etc., may be implemented with a configuration to be described below, for example, in other embodiments.

(Variation Regarding Number of Players)

The embodiment above is directed to, as an example, a multiple-player game in which first players who use the controllers 5 and a second player who uses the terminal device 7 play one game at the same time. In other embodiments, the game played on the game system 1 may be a game played by one player who uses the terminal device 7. That is, the CPU 10 may control the action of a predetermined control object based at least on the terminal operation data. In this case, the CPU 10 generates a television image including a game image that represents the game space and corresponds to the control object, and at least a portion of the camera image (player image). As in the embodiment above, it is possible to present the image of the face of the second player during gameplay in an easy-to-view manner to people other than the second player. A "game image that corresponds to a control object" may be the same as, or different from, the terminal image. For example, where a game image in so-called "first-person perspective" is displayed as the terminal image on the terminal device 7, a game image including the control object therein (a game image in third-person perspective) may be displayed as the television image on the television 2.

In other embodiments, the game system 1 may include a plurality of terminal devices 7 so that a plurality of second players can play one game at the same time. Then, the game device 3 (the CPU 10) may obtain camera image data from the terminal devices 7 to generate a television image including player images based on the obtained camera images. Then, the game system 1 can present the facial expression of each of a plurality of players during gameplay in an easy-to-view manner.

(Variation Regarding Player Image Displayed on Television 2)

The embodiment above is directed to a case in which the game device 3 displays the player image in three different modes: (a) where the player image is displayed in real time (step S34); (b) where the player image is displayed in response to a satisfaction of a predetermined game condition (step S36); and (c) where the player image is displayed after the game is ended (step S10). Herein, the player image may be displayed at any point in time during game processes (including post-game processes). For example, in other embodiments, the game device 3 may display the player image in one or two of the three modes described above.

In other embodiments, the player (more specifically, the second player who is using the terminal device 7) may be allowed to specify the mode in which the player image is displayed. In consideration of users who do not wish their faces be displayed on the screen, the game device 3 may disable the display of the player image in response to an instruction from a player. That is, users may be allowed to turn off the function of displaying the player image.

The player image may be displayed as a still image or as a motion video. For example, while the game device 3 displays a still image as the saved player image in the embodiment above, it may display a motion video as the saved player image in other embodiments. That is, the game device 3 may store a plurality of player images generated over a predetermined period (a series of player images which together form a motion video), and successively update and display the plurality of player images in response to a satisfaction of a predetermined game condition.

(Variation Regarding Configuration of Game System)

In the embodiment above, the game system 1 includes the game device 3, the terminal device 7, the controller 5, and the television 2. Herein, there is no limitation on the game system as long as the game system includes a game device and at least two controller devices, wherein images can be displayed on the display unit of at least one of the controller devices and on a predetermined display device. For example, the game system may be provided in such a form that a predetermined display device (the television 2) is not included.

For example, the game system 1 may be provided in a form in which a display device similar to the terminal device 7 is included as a predetermined display device. That is, the game system may have a configuration including two controller devices having a display unit, and a game device. In this case, the game device 3 may display a player image based on a camera image obtained from a first terminal device on the display unit of a second terminal device while displaying a player image based on a camera image obtained from the second terminal device on the display unit of the first terminal device. Then, the game system 1 can present, to each player, the face of the opponent player during gameplay.

(Variation Regarding Controller Device Having Display Unit)

While the terminal device 7 is used as a controller device having a display unit in the embodiment above, the controller device is not limited to this. For example, the game system may have a configuration including a portable game device having a display unit, instead of the terminal device 7. In other embodiments, the game system may have a configuration including two portable game devices used as controller devices, and a game device. Moreover, in a case in which game processes are performed on at least one portable game device, the game system may have a configuration including two portable game devices used as controller devices.

(Variation Regarding Information Processing Device Performing Game Process)

While a series of game processes of the game system 1 is performed by the game device 3 in the embodiment above, some of the game processes may be performed by another device. For example, in other embodiments, some of the game processes (e.g., the terminal image generation process) may be performed by the terminal device 7. In other embodiments, in an input system that includes a plurality of information processing devices that can communicate with each other, the game processes may be divided among the plurality of information processing devices. That is, a game system may include a controller device, a portable display device and a game device, wherein the game device includes: (a) a data obtaining unit for obtaining first operation data representing an operation performed on the controller device, second operation data representing an operation performed on the portable display device, and data of a captured image captured by an image-capturing unit; (b) an action control unit for controlling an action of each first control object based on the first operation data and an action of a second control object based on the second operation data in a virtual space; (c) a first image generation unit for generating a first game image which includes a game image that represents the virtual space and corresponds to the first control object, and at least a portion of the captured image, as the first game image to be displayed on a predetermined display device separate from the portable display device; and (d) a second image generation unit for generating a second game image that represents the virtual space and corresponds to the second control object, as the second game image to be displayed on the portable display device. The units (a) to (d) may be provided in a single device or in a plurality of devices.

The game system may include a portable display device and a game device, wherein the game device includes: (e) a data obtaining unit for obtaining operation data representing an operation performed on the portable display device, and a captured image captured by an image-capturing unit; (f) an action control unit for controlling an action of a predetermined control object based on the operation data in a virtual space; (g) a first image generation unit for generating a first game image which includes a game image that represents the virtual space and corresponds to the control object, and at least a portion of the captured image, as the first game image to be displayed on a predetermined display device separate from the portable display device; and (h) a second image generation unit for generating a second game image that represents the virtual space and corresponds to the control object, as the second game image to be displayed on the portable display device. The units (e) to (h) may be provided in e single device or in e plurality of devices.

Where game processes are performed by a plurality of information processing devices, the game processes will be complicated if game processes to be performed by different information processing devices are synchronized together. In contrast, where game processes are performed by a single game device 3, wherein the terminal device 7 is responsible for the process of receiving and displaying game images, as in the embodiment above (i.e., where the terminal device 7 serves as a thin client terminal), there is no need to synchronize the game processes between a plurality of information processing devices, and it is therefore possible to simplify the game processes.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, (a) non-volatile memory, including by way of example semiconductor memory devices, such as Erasable Programmable Read-Only Memory (EPROM), Electrically Erasable Programmable Read-Only Memory (EEPROM), and flash memory devices; (b) magnetic disks such as internal hard disks and removable disks; (c) magneto-optical disks; and (d) Compact Disc Read-Only Memory (CD-ROM). Any of the foregoing may be supplemented by, or incorporated in, specially-designed ASICs (application-specific integrated circuits).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

The processing system/circuitry described in this specification is "programmed" to control processes such as game processes in accordance with the "logic" described in the specification. A processing system including at least one CPU when executing instructions in accordance this logic may operate as "programmed logic circuitry" to perform the operations defined by the logic.

As described above, the present embodiment is applicable, for example, to game systems, game devices, game programs, etc., with the aim of, for example, presenting an image of a player during gameplay to people other than the player.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising:
a plurality of controller devices;
a portable display device that includes a camera and a display; and
a game device comprising:
 a processing arrangement that includes at least one processor coupled to a memory device, the processing arrangement coupled to the plurality of controller devices and the portable display device, the processing arrangement configured to:
  obtain respective first operation data representing operations performed on the plurality of controller devices;
  obtain second operation data representing an operation performed on the portable display device; and
  obtain data of a captured image captured by the camera;
  control a plurality of first control objects that are located in a virtual space based on the respective first operation data; and
  control an action of a second control object that is located in the virtual space based on the second operation data;
  generate a first game image that includes a plurality of different game images respectively corresponding to the plurality of first control objects and at least a portion of the captured image;
  generate a second game image that includes the second control object located in the virtual space;
  output the first game image to a predetermined display device that is separate from the portable display device; and
  output the second game image to the portable display device.

2. The game system according to claim 1, wherein the processing arrangement is further configured to:
perform a recognition process for recognizing a face in the captured image; and
generate the first game image so that the first game image includes a portion of the captured image that includes an image of the recognized face.

3. The game system according to claim 2, wherein the processing arrangement is further configured to perform a predetermined image process on the image of the captured image that includes the recognized face to thereby generate the first game image that includes the processed image.

4. The game system according to claim 2, wherein the processing arrangement is further configured to:
perform the recognition process in response to obtaining the captured image;
generate a first game image including the image of the recognized face in response to the recognition of the face by the recognition process; and
output the first game image to the predetermined display device in response to the generation of the first game image.

5. The game system according to claim 4, wherein the processing arrangement is further configured to:
successively obtain data of the captured image; and
update the image of the recognized face with a frequency that is less than that with which the data of the captured image is obtained.

6. The game system according to claim 1, wherein the processing arrangement is further configured to:
set plural first virtual cameras respectively corresponding the plurality of first control objects;
set a second virtual camera corresponding to the second control object in the virtual space;
generate the plurality of game images based on views of the virtual space that respectively correspond to the plural first virtual cameras; and
generate the second game image based on a view of the virtual space from the second virtual camera.

7. The game system according to claim 6, wherein the processing arrangement is further configured to:
move the plurality of control objects in the virtual space based on the first operation data; and
set the plural virtual cameras so that the respectively corresponding plurality of first virtual objects are in a field of view.

8. The game system according to claim 6, wherein the processing arrangement is further configured to:
move a second object arranged in the virtual space, as the second control object, based on the second operation data; and
set the second virtual camera so that the second object is included in a viewing field range of the second virtual camera.

9. The game system according to claim 1, wherein the processing arrangement is further configured to:
store a captured image obtained at a predetermined point in time in a memory device; and
a first game image is generated to include at least a portion of the captured image stored in the memory device.

10. The game system according to claim 1, wherein the processing arrangement is further configured to:
determine whether a predetermined game condition has been satisfied for each of the plurality of first control objects; and
generate a first game image by superimposing at least a portion of the captured image onto each one of the different game images that correspond to those of the plurality of first control objects for which the predetermined game condition has been satisfied.

11. A game system comprising:
a portable display device that includes a camera and a display; and
a game device that is separately provided from the portable display device, the game device comprising:
a transceiver that is configured to receive operation data representing an operation performed on the portable display device, and a captured image captured by the camera; and
a processing system that includes at least one processor coupled to a memory, the processing system configured to:
control an action of a virtual object that is located in a virtual world based on the operation data;
generate a first game image which includes: 1) an image of a view of the virtual world that includes the virtual object, and 2) at least some of the captured image;
generate a second game image that represents the virtual space and corresponds to the virtual object;
output the first game image to a predetermined display device separate from the portable display device; and
output, using the transceiver, the second game image to the portable display device.

12. A method for use with a game system that comprises a plurality of controller devices, a portable display device, and a game device, wherein the portable display device includes a camera and a display device, the method comprising:
obtaining respective first operation data representing operations performed by the plurality of controller devices;
obtaining second operation data representing an operation performed on the portable display device;
obtaining data of a captured image that has been captured by the camera;
controlling, using at least one processor of the game system, each one of a plurality of first control objects that are each located in a virtual space based on respective application of first operation data that represent operations performed by the plurality of controller devices;
controlling, using the at least one processor of the game system, an action of a second control object located in the virtual space based on the second operation data;
generating, using the at least one processor of the game system, a first game image that includes 1) a plurality of game images that respectively correspond to the plurality of first control objects that are located in the virtual space, and 2) at least a portion of the captured image;
generating, using the at least one processor of the game system, a second game image that corresponds to the second control object located in the virtual space;
displaying the first game image on a predetermined display device that is separate from the portable display device; and
displaying the second game image on the display device of the portable display device.

13. The method according to claim 12, further comprising:
performing, using the at least one processor of the game system, a recognition process of recognizing a face in the captured image, wherein:
the portion of the captured image that is included in the first image includes the face recognized by the recognition process.

14. The method according to claim 13, wherein a predetermined image process is performed on the image of the captured image that includes the face recognized by the recognition process, thereby generating the first game image including the processed image.

15. The method according to claim 13, wherein:
the recognition process is performed in response to the obtainment of the captured image;
the first game image includes the image of the recognized face in response to the recognition of the face by the recognition process; and
the first game image is displayed on the display device in response to the generation of the first game image.

16. The method according to claim 15, wherein:
data of the captured image is obtained successively; and
the image of the recognized face is updated with a frequency that is less than that with which data of the captured image is obtained.

17. The method according to claim 12, further comprising:
setting a plurality of first virtual cameras that respectively correspond to the plurality of first control objects in the virtual space; and
setting a second virtual camera that corresponds to second control object in the virtual space, wherein:
the plurality of game images are generated based on a view of the virtual space from respective first virtual cameras that respectively correspond to the plurality first control objects; and
the second game image is generated based on a view of the virtual space from the second virtual camera.

18. The method according to claim 17, wherein:
each one of the plurality of first control objects moves through the virtual space based on respective application of the first operation data; and
each one of the plurality of first virtual cameras is set so that the respectively corresponding first control object is maintained within a viewing field of the respective first virtual camera.

19. The method according to claim 17, wherein:
the second control object is controlled to move through the virtual space based on the second operation data; and
the second virtual camera is set so that the second object is maintained within the view of the virtual space of the second virtual camera.

20. The method according to claim 12, further comprising:
storing a captured image obtained at a predetermined point in time in a predetermined storage device, wherein:
the portion of the captured image that is included in the first game is based on stored captured image.

21. The method according to claim 12, further comprising:
determining whether a predetermined game condition has been satisfied for each one of the plurality of first control objects, wherein:
the first game is generated by superimposing at least a portion of the captured image onto at least one of the plurality of game images that corresponds one of the plurality of first control objects for which the predetermined game condition has been satisfied.

22. A method for use with a game system comprising a portable display device and a game device that is separate from the portable display device, the portable display device comprising a camera and a display device, the game device comprising a processing system that includes at least one processor coupled to a memory and a transceiver that is configured to communicate with the portable display device, the method comprising:
obtaining, using the transceiver of the game device, operation data representing an operation performed on the portable display device and a captured image captured by the camera;
controlling, using the processing system of the game device, an action of a predetermined control object based on the operation data in a virtual space;
generating, using the processing system of the game device, a first game image that includes 1) a game image that represents the virtual space and corresponds to the control object, and 2) at least a portion of the captured image;
generating, using the processing system of the game device, a second game image that represents the virtual space and corresponds to the control object;
displaying the first game image on a predetermined display device separate from the portable display device; and
displaying the second game image on the display device of the portable display device.

23. A game device capable of communicating with a plurality of controller devices and a portable display device, the game device comprising:
a processing system that includes at least one processor, the processing system configured to:
receive first operation data that represents operations performed on each one of the plurality of controller devices;
receive second operation data representing an operation performed on the portable display device;
receive data of a captured image captured by a camera of the portable display device;
control plural first control objects that are each located in a virtual space based on the first operation data;
control an action of a second control object located in a virtual space based on the second operation data;
generate a first game image which includes (1) plural game images that respectively correspond to the plural first control objects located in the virtual space and corresponds to the first control object and (2) at least a portion of the captured image;
generate a second game image that represents the virtual space and corresponds to the second control object;
cause the first game image to be output to a display device separate from the portable display device; and
cause the second game image to be output to the portable display device.

24. A game device capable of communicating with a portable display device that is separate from the game device, the game device comprising:
a data obtaining unit that is, by using at least one processor of the game device, configured to obtain operation data representing an operation performed on the portable display device and a captured image captured by an image-capturing unit of the portable display device;
an action control unit that is, by using the at least one processor of the game device, configured to control an action of a control object that is located in a virtual space based on the operation data;
a first image generation unit that is, by using the at least one processor of the game device, configured to generate a first game image which includes (1) a game image that corresponds to the control object in the virtual space, and (2) at least a portion of the captured image;
a second image generation unit that is, by using the at least one processor of the game device, configured to generate a second game image that corresponds to the control object located in the virtual space;
a first image output unit that is, by using the at least one processor of the game device, configured to output the first game image to a predetermined display device separate from the portable display device; and a second image output unit that is, by using the at least one processor of the game device, configured to output the second game image to the portable display device.

25. A non-transitory computer-readable storage medium storing a game program to be executed by a computer of a game device capable of communicating with plural controller devices and a portable display device, the game program comprising instructions that cause the computer to:
   acquire first operation data representing plural operations respectively performed on plural controller devices;
   acquire second operation data representing an operation performed on the portable display device;
   acquire data of a captured image that has been captured by a camera of the portable display device;
   control actions for plural control objects, each of which are located in a virtual space, based on the acquired first operation data;
   control an action of a second control object that is located in the virtual space based on the second operation data;
   generate a first game image to be displayed on a display device that is separate from the portable display device, the first game image including (1) plural game images being divided into separate areas of the first game image, where each of the plural game images represents a corresponding one of the plural control objects that are located in the virtual space, and (2) at least a portion of the captured image; and
   generate a second game image to be displayed on the portable display device, the second game image representing the second control object in the virtual space.

26. A non-transitory computer-readable storage medium storing a game program to be executed by a computer of a game device capable of communicating with a portable display device that is separate from the game device, the game program comprising instructions that cause the computer to:
   obtain operation data representing an operation performed on the portable display device, and a captured image captured by a camera of the portable display device;
   control an action of a predetermined control object that is located in a virtual space based on the operation data;
   generate a first game image to be displayed on a predetermined display device that is separate from the portable display device, the first game image including (1) a game image of the control object that is located in the virtual space as viewed from a virtual camera whose pose is maintained in correspondence to the control object, and (2) at least a portion of the captured image; and
   generate a second game image to be displayed on the portable display device, the second game image representing the virtual space and corresponding to the control object.

27. A video game system that provides common viewing to a virtual space for a plurality of players, the video game system comprising:
   a plurality of controllers that are each configured to provide input to control aspects of a respective video game object located in the virtual space;
   a portable game device comprising:
      at least one control input configured to acquire input based on player use of the portable game device;
      a display device configured to display a view the virtual space that includes a virtual object that is controlled, at least in part, in accordance with the acquired input of the at least one control input of the portable game device; and
      at least one camera configured to acquire a captured image while the display device is displaying the view of the virtual space; and
   a common display configured to, in accordance with video game images generated by at least one processor of the video game system, simultaneously display:
      a plurality of separate viewpoints of the virtual space that respectively correspond to the video game objects that are controlled, at least in part, based on respective inputs provided from the plurality of controllers; and
      a further image that is based on the captured image.

28. The video game system of claim 27, wherein the plurality of separate viewpoints are adjusted in accordance with movement of a respective video game object within the virtual world.

29. A video game system that provides viewing of a virtual space that includes a first virtual object and a second virtual object, the video game system comprising:
   a video game controller configured to provide input to control aspects of the first virtual object that is located in the virtual space;
   a portable game device comprising:
      at least one input configured to detect player operations of the portable game device;
      a display device configured to display a second view the virtual space, where the second view includes the second virtual object, where the second virtual object is controlled, at least in part, in accordance with the detected player operations of the portable game device; and
      at least one camera configured to acquire a captured image while the display device is displaying the second view of the virtual space; and
   a common display configured to, in accordance with video game images generated by at least one processor of the video game system, simultaneously display:
      a first view of the virtual space that is dependent on how the first virtual object is controlled in the virtual space using, at least in part, the input provided from the video game controller; and
      a further image that is based on the captured image.

30. The video game system of claim 29, wherein the at least one input includes at least one of: an acceleration sensor, a gyro sensor, and an operation section.

31. A game system comprising:
   a game controller configured to be operated by a first user to control a first object that is located in a virtual space;
   a portable device configured to be operated by a second user, the portable device comprising:
      a first transceiver;
      a display configured to display a second game image of the virtual space that includes a second virtual object that is controlled, at least in part, based on operation of the portable device by the second user; and
      at least one camera configured to capture an image in correspondence with operation of the portable device for controlling the second virtual object; and
   a game device comprising:
      a second transceiver configured to communicate with the first transceiver of the portable device; and
      a processing system that includes at least one processor, the processing system configured to:
         control the first object located in the virtual space based on operation inputs provided from the game controller;
         generate a first game image that includes 1) an image of the virtual space with a view of the first object that is set in accordance with a position and/or direction of the first object and 2) another image that is at least a portion of the captured image or an image that is a function of the captured image; and
output the generated first game image to a display device that is different from the display of the portable device.

\* \* \* \* \*